United States Patent
Akkarakaran et al.

(10) Patent No.: US 11,330,550 B2
(45) Date of Patent: May 10, 2022

(54) POSITIONING WITH RELAYS

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/815,810

(22) Filed: Mar. 11, 2020

(65) Prior Publication Data

US 2020/0296680 A1 Sep. 17, 2020

Related U.S. Application Data

(60) Provisional application No. 62/819,447, filed on Mar. 15, 2019.

(51) Int. Cl.
*H04W 64/00* (2009.01)
*H04W 4/029* (2018.01)
(Continued)

(52) U.S. Cl.
CPC ........ *H04W 64/003* (2013.01); *H04B 7/2606* (2013.01); *H04L 5/0048* (2013.01);
(Continued)

(58) Field of Classification Search
CPC ............... H04W 64/003; H04W 4/029; H04W 88/04; H04W 72/046; H04W 76/27;
(Continued)

(56) References Cited

U.S. PATENT DOCUMENTS

2011/0014911 A1 1/2011 Baldemair et al.
2012/0184302 A1* 7/2012 Kazmi ................... H04W 64/00
455/456.5
(Continued)

FOREIGN PATENT DOCUMENTS

WO WO-2016196431 A1 12/2016

OTHER PUBLICATIONS

Partial International Search Report—PCT/US2020/022246—ISAEPO—dated Jun. 9, 2020 (191798WO).
(Continued)

*Primary Examiner* — Marisol Figueroa
(74) *Attorney, Agent, or Firm* — Thien T. Nguyen

(57) ABSTRACT

Methods, systems, and devices for wireless communications are described. A position of a user equipment (UE) may be determined when communications between the UE and a base station are routed through a relay node. For example, the UE 115 may determine whether communications are received from the base station or the relay node based on positioning assistance data that contains positioning-related information about different base stations and relay nodes in the system. The UE may then transmit a position metric based on this determination, where a location server uses this position metric for determining the location of the UE. Additionally or alternatively, the location server or base station may use the positioning assistance data to determine whether an uplink transmission is received directly from the UE or via the relay node and may generate a position metric that the location server uses for determining the location of the UE.

37 Claims, 26 Drawing Sheets

(51) Int. Cl.
  *H04W 88/04* (2009.01)
  *H04B 7/26* (2006.01)
  *H04L 5/00* (2006.01)
  *H04W 72/04* (2009.01)
  *H04W 76/27* (2018.01)
  *H04L 101/622* (2022.01)
  *H04L 29/12* (2006.01)

(52) U.S. Cl.
  CPC ......... *H04L 61/6022* (2013.01); *H04W 4/029* (2018.02); *H04W 72/042* (2013.01); *H04W 72/046* (2013.01); *H04W 76/27* (2018.02); *H04W 88/04* (2013.01)

(58) Field of Classification Search
  CPC . H04W 72/042; H04W 64/00; H04W 84/047; H04L 5/0048; H04L 61/6022; H04B 7/2606; H04B 7/15528; G01S 5/0273; G01S 5/14; G01S 5/12; G01S 13/765; G01S 5/0263
  See application file for complete search history.

(56) References Cited

U.S. PATENT DOCUMENTS

| | | | |
|---|---|---|---|
| 2014/0092771 A1* | 4/2014 | Siomina | H04W 24/08 370/252 |
| 2015/0146609 A1 | 5/2015 | Park et al. | |
| 2016/0057687 A1* | 2/2016 | Horn | H04W 36/28 370/331 |
| 2016/0195601 A1 | 7/2016 | Siomina et al. | |
| 2017/0041750 A1* | 2/2017 | Jose | G01S 5/10 |
| 2018/0035354 A1* | 2/2018 | Martin | H04W 40/22 |
| 2018/0063820 A1 | 3/2018 | Xiong et al. | |
| 2018/0310127 A1* | 10/2018 | Xia | H04W 24/10 |
| 2020/0304226 A1 | 9/2020 | Ryden et al. | |
| 2021/0084555 A1* | 3/2021 | Feng | H04W 36/165 |

OTHER PUBLICATIONS

International Search Report and Written Opinion—PCT/US2020/022246—ISAEPO—dated Oct. 5, 2020 (191798WO).

* cited by examiner

POSITIONING WITH RELAYS

CROSS REFERENCE

The present Application for Patent claims the benefit of U.S. Provisional Patent Application No. 62/819,447 by AKKARAKARAN, et al., entitled "POSITIONING WITH RELAYS," filed Mar. 15, 2019, assigned to the assignee hereof, and expressly incorporated herein.

BACKGROUND

The following relates generally to wireless communications, and more specifically to positioning with relays.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). A wireless communications network may implement techniques to keep track of the position of a UE in the wireless communications network. Additionally, in some cases, the wireless communications network may utilize relays to increase coverage for uplink data transmissions, downlink data transmissions, or both, where the different data transmissions are routed through a relay rather than travelling directly between a base station and a UE. However, the utilization of relays in a wireless communications network may interfere with keeping track of the position of the UE based on the UE and/or base station not knowing whether signals used for determining the position of the UE are coming from a transmitting node (e.g., a base station or a UE) or from a relay.

SUMMARY

The described techniques relate to improved methods, systems, devices, and apparatuses that support positioning with relays. Generally, the described techniques provide for determining a position of a user equipment (UE) when communications between the UE and a base station are routed through a relay node. In some implementations, a location server may store positioning assistance data (e.g., almanac information, such as a base station almanac (BSA)) that contains positioning-related information (e.g., cell identifiers, UE identifiers, geographic locations, beam identifiers, backhaul beams, access beams, node types, etc.) about different base stations and relay nodes in a wireless communications system. The location server may transmit this positioning assistance data to the UE via the base station and the relay (e.g., via a Long Term Evolution (LTE) positioning protocol (LPP) message and connection with the UE). In some cases, the UE may then receive one or more position reference signals (PRSs) and may use the positioning assistance data to determine whether the PRSs are received from the base station or the relay node. Accordingly, the UE may generate a positioning metric based on determining whether the PRSs are received from the base station or the relay and may transmit the positioning metric to the location server (e.g., via the relay node and the base station), where the location server determines the location of the UE based on the positioning metric. For example, the positioning metric may include a detected time of arrival, an angle of arrival, or both.

In some cases, the UE may determine whether the PRSs are received from the base station or the relay node based on a delay associated with the PRSs (e.g., PRSs routed through the relay node may have a longer delay time); an orientation, attenuation, or both for an angle of incidence for the relay node included in the almanac information; a PRS identifier or scrambling code associated with the PRSs that identify which of the base station or relay node are transmitting the PRSs; or a combination thereof. Additionally or alternatively, the UE may determine the position metric based on hypotheses that the PRSs are received from either the base station or the relay node, where the UE determines one or more candidate positioning metrics (e.g., or pairs of candidate positioning metrics) based on the hypotheses. The UE may then select a candidate positioning metric from the hypotheses as the positioning metric (e.g., a round trip time (RTT) positioning metric) based on an outlier rejection scheme. In some cases, the base station may perform a similar determination process to generate a position metric based on receiving a PRS from the UE and using the almanac information. The base station may then transmit the position metric to the location server to enable the location server to determine the location (e.g., position) of the UE.

A method of wireless communications by a UE is described. The method may include receiving positioning assistance data (e.g., almanac information) that indicates that a first node operates as a relay for a second node (e.g., that operates as a base station), receiving a PRS, and generating a positioning metric based on the positioning assistance data and the PRS.

An apparatus for wireless communications by a UE is described. The apparatus may include a processor, memory in electronic communication with the processor, and instructions stored in the memory. The instructions may be executable by the processor to cause the apparatus to receive positioning assistance data (e.g., almanac information) that indicates that a first node operates as a relay for a second node (e.g., that operates as a base station), to receive a PRS, and to generate a positioning metric based on the positioning assistance data and the PRS.

Another apparatus for wireless communications by a UE is described. The apparatus may include means for receiving positioning assistance data (e.g., almanac information) that indicates that a first node operates as a relay for a second node (e.g., that operates as a base station), means for receiving a PRS, and means for generating a positioning metric based on the positioning assistance data and the PRS.

A non-transitory computer-readable medium storing code for wireless communications by a UE is described. The code may include instructions executable by a processor to receive positioning assistance data (e.g., almanac information) that indicates that a first node operates as a relay for a second node (e.g., that operates as a base station), to receive a PRS, and to generate a positioning metric based on the positioning assistance data and the PRS.

Some examples of the method, apparatuses, and non-transitory computer-readable medium described herein may further include operations, features, means, or instructions for determining that the PRS is received from the first node based on the positioning assistance data and generating the positioning metric based on determining that the PRS is received from the first node.

Some examples of the method, apparatuses, and non-transitory computer-readable medium described herein may further include operations, features, means, or instructions for determining that the PRS is received from the second node based on the positioning assistance data and generating the positioning metric based on determining that the PRS is received from the second node.

Some examples of the method, apparatuses, and non-transitory computer-readable medium described herein may further include operations, features, means, or instructions for selecting a third node to monitor that is not associated with a relay node based on the positioning assistance data, where the PRS is received from the third node.

In some examples of the method, apparatuses, and non-transitory computer-readable medium described herein, the positioning assistance data may include a first node type that indicates the first node is a relay node and a second node type that indicates that the second node is a base station.

Some examples of the method, apparatuses, and non-transitory computer-readable medium described herein may further include operations, features, means, or instructions for processing the positioning assistance data to determine one or more of a cell identifier, a UE identifier, a geographic location, or a beam identifier, for the first node, the second node, or both.

Some examples of the method, apparatuses, and non-transitory computer-readable medium described herein may further include operations, features, means, or instructions for processing the positioning assistance data to determine one or more of an antenna array configuration, an antenna panel configuration, an orientation, the first node, a beam pattern, a backhaul beam, or an access beam, for the first node, the second node, or both.

Some examples of the method, apparatuses, and non-transitory computer-readable medium described herein may further include operations, features, means, or instructions for processing the positioning assistance data to determine a backhaul gain between the first and second nodes, an access gain between the first node and the UE, or both.

Some examples of the method, apparatuses, and non-transitory computer-readable medium described herein may further include operations, features, means, or instructions for processing the positioning assistance data to determine the first node is an active relay or a passive relay.

Some examples of the method, apparatuses, and non-transitory computer-readable medium described herein may further include operations, features, means, or instructions for processing the positioning assistance data to determine an orientation, attenuation, or both, for at least one angle of incidence for the first node.

Some examples of the method, apparatuses, and non-transitory computer-readable medium described herein may further include operations, features, means, or instructions for processing the positioning assistance data to determine delay introduced by the first node when relaying a transmission.

In some examples of the method, apparatuses, and non-transitory computer-readable medium described herein, the positioning metric may include a detected time of arrival, an angle of arrival, or both.

Some examples of the method, apparatuses, and non-transitory computer-readable medium described herein may further include operations, features, means, or instructions for determining that the PRS is from one of the first node or the second based on a PRS identifier (PRS-ID) or a scrambling code associated with the PRS.

Some examples of the method, apparatuses, and non-transitory computer-readable medium described herein may further include operations, features, means, or instructions for determining the positioning metric based on one or more of a detected arrival time of the PRS, a propagation time, a relay delay, or any combination thereof.

Some examples of the method, apparatuses, and non-transitory computer-readable medium described herein may further include operations, features, means, or instructions for determining a first candidate positioning metric based on a first hypothesis that the PRS is received from the first node, determining a second candidate positioning metric based on a second hypothesis that the PRS is received from the second node, and selecting one of the first candidate positioning metric and the second candidate positioning metric as the positioning metric based on an outlier rejection scheme.

Some examples of the method, apparatuses, and non-transitory computer-readable medium described herein may further include operations, features, means, or instructions for determining a first pair of candidate positioning metrics based on a first hypothesis that the PRS is received from the first node, determining a second pair of candidate positioning metrics based on a second hypothesis that the PRS is received from the second node, and selecting one of the first pair of candidate positioning metrics and the second pair of candidate positioning metrics as the positioning metric based on an outlier rejection scheme, where the positioning metric is an RTT positioning metric.

Some examples of the method, apparatuses, and non-transitory computer-readable medium described herein may further include operations, features, means, or instructions for transmitting the positioning metric to the second node or a location server.

Some examples of the method, apparatuses, and non-transitory computer-readable medium described herein may further include operations, features, means, or instructions for determining a geographic location of the UE based on the positioning metric.

In some examples of the method, apparatuses, and non-transitory computer-readable medium described herein, the positioning metric may be a differential measurement.

Some examples of the method, apparatuses, and non-transitory computer-readable medium described herein may further include operations, features, means, or instructions for receiving an indication to avoid using the first and second nodes when generating the differential measurement.

In some examples of the method, apparatuses, and non-transitory computer-readable medium described herein, the indication may be an LPP message, an RRC message, a medium access control (MAC) control element (CE), or downlink control information (DCI).

Some examples of the method, apparatuses, and non-transitory computer-readable medium described herein may further include operations, features, means, or instructions for determining to avoid using the first and second nodes when generating the differential measurement based on receiving side information indicating presence of a relay.

A method of wireless communications by a relay node is described. The method may include receiving a transmission time interval (TTI) format indication that indicates that a TTI is either a downlink TTI or an uplink TTI, receiving a transmission for relaying within the TTI, and relaying the transmission during the TTI in accordance with the TTI format indication.

An apparatus for wireless communications by a relay node is described. The apparatus may include a processor, memory in electronic communication with the processor, and instructions stored in the memory. The instructions may be executable by the processor to cause the apparatus to receive a TTI format indication that indicates that a TTI is either a downlink TTI or an uplink TTI, to receive a transmission for relaying within the TTI, and to relay the transmission during the TTI in accordance with the TTI format indication.

Another apparatus for wireless communications by a relay node is described. The apparatus may include means for receiving a TTI format indication that indicates that a TTI is either a downlink TTI or an uplink TTI, means for receiving a transmission for relaying within the TTI, and means for relaying the transmission during the TTI in accordance with the TTI format indication.

A non-transitory computer-readable medium storing code for wireless communications by a relay node is described. The code may include instructions executable by a processor to receive a TTI format indication that indicates that a TTI is either a downlink TTI or an uplink TTI, to receive a transmission for relaying within the TTI, and to relay the transmission during the TTI in accordance with the TTI format indication.

Some examples of the method, apparatuses, and non-transitory computer-readable medium described herein may further include operations, features, means, or instructions for receiving a configuration that indicates an uplink amplification level for relaying an uplink transmission from a UE to a base station and a downlink amplification level for relaying a downlink transmission from the base station to the UE, where the transmission is relayed in accordance with the configuration.

In some examples of the method, apparatuses, and non-transitory computer-readable medium described herein, relaying the transmission may include operations, features, means, or instructions for relaying an uplink transmission to the base station in accordance with the uplink amplification level.

In some examples of the method, apparatuses, and non-transitory computer-readable medium described herein, relaying the transmission may include operations, features, means, or instructions for relaying a downlink transmission to the UE in accordance with the downlink amplification level.

Some examples of the method, apparatuses, and non-transitory computer-readable medium described herein may further include operations, features, means, or instructions for processing the configuration to determine a reference signal configuration, where the transmission is relayed in accordance with the reference signal configuration.

In some examples of the method, apparatuses, and non-transitory computer-readable medium described herein, the reference signal configuration may be a channel state information reference signal (CSI-RS) configuration, a synchronization signal block (SSB) configuration, a sounding reference signal (SRS) configuration, a PRS configuration, or any combination thereof.

Some examples of the method, apparatuses, and non-transitory computer-readable medium described herein may further include operations, features, means, or instructions for processing the configuration to determine a subset of channels of a set of channels to relay, where the transmission is received within a first channel of the subset of channels.

Some examples of the method, apparatuses, and non-transitory computer-readable medium described herein may further include operations, features, means, or instructions for processing the configuration to determine an uplink power control configuration, where the transmission is transmitted in accordance with the uplink power control configuration.

A method of wireless communications by a location server is described. The method may include transmitting positioning assistance data (e.g., almanac information) that indicates that a first node operates as a relay (e.g., for a base station, a UE, etc.), receiving a positioning metric that is generated based on the positioning assistance data and a PRS, and determining a geographic location of a UE based on the positioning metric.

An apparatus for wireless communications by a location server is described. The apparatus may include a processor, memory in electronic communication with the processor, and instructions stored in the memory. The instructions may be executable by the processor to cause the apparatus to transmit positioning assistance data (e.g., almanac information) that indicates that a first node operates as a relay (e.g., for a base station, a UE, etc.), to receive a positioning metric that is generated based on the positioning assistance data and a PRS, and to determine a geographic location of a UE based on the positioning metric.

Another apparatus for wireless communications by a location server is described. The apparatus may include means for transmitting positioning assistance data (e.g., almanac information) that indicates that a first node operates as a relay (e.g., for a base station, a UE, etc.), means for receiving a positioning metric that is generated based on the positioning assistance data and a PRS, and means for determining a geographic location of a UE based on the positioning metric.

A non-transitory computer-readable medium storing code for wireless communications by a location server is described. The code may include instructions executable by a processor to transmit positioning assistance data (e.g., almanac information) that indicates that a first node operates as a relay (e.g., for a base station, a UE, etc.), to receive a positioning metric that is generated based on the positioning assistance data and a PRS, and to determine a geographic location of a UE based on the positioning metric.

Some examples of the method, apparatuses, and non-transitory computer-readable medium described herein may further include operations, features, means, or instructions for determining that the PRS is received from the first node based on the positioning assistance data and generating the positioning metric based on determining that the PRS is received from the first node.

Some examples of the method, apparatuses, and non-transitory computer-readable medium described herein may further include operations, features, means, or instructions for determining that the PRS is received from the base station based on the positioning assistance data and generating the positioning metric based on determining that the PRS is received from the second node.

In some examples of the method, apparatuses, and non-transitory computer-readable medium described herein, the positioning assistance data indicates one or more of a cell identifier, a UE identifier, a geographic location, or a beam identifier, for the first node, the second node, or both.

In some examples of the method, apparatuses, and non-transitory computer-readable medium described herein, the positioning assistance data indicates one or more of an antenna array configuration, an antenna panel configuration, an orientation, or a beam pattern, for the first node, the second node, or both.

In some examples of the method, apparatuses, and non-transitory computer-readable medium described herein, the positioning assistance data indicates a backhaul gain between the first and second nodes, an access gain between the first node and the UE, or both.

In some examples of the method, apparatuses, and non-transitory computer-readable medium described herein, the positioning assistance data may indicate that the first node is an active relay or a passive relay.

In some examples of the method, apparatuses, and non-transitory computer-readable medium described herein, the positioning assistance data may indicate an orientation, attenuation, or both, for at least one angle of incidence for the first node.

In some examples of the method, apparatuses, and non-transitory computer-readable medium described herein, the positioning assistance data may indicate delay introduced by the first node when relaying a transmission.

In some examples of the method, apparatuses, and non-transitory computer-readable medium described herein, the positioning metric may include a detected time of arrival, an angle of arrival, or both.

Some examples of the method, apparatuses, and non-transitory computer-readable medium described herein may further include operations, features, means, or instructions for generating the PRS based on a PRS-ID and transmitting the PRS.

Some examples of the method, apparatuses, and non-transitory computer-readable medium described herein may further include operations, features, means, or instructions for generating the PRS based on a scrambling of the PRS using a scrambling code and transmitting the generated PRS.

Some examples of the method, apparatuses, and non-transitory computer-readable medium described herein may further include operations, features, means, or instructions for determining a first candidate positioning metric based on a first hypothesis that the PRS is received from the first node, determining a second candidate positioning metric based on a second hypothesis that the PRS is received from the base station, and selecting one of the first candidate positioning metric and the second candidate positioning metric as the positioning metric based on an outlier rejection scheme.

Some examples of the method, apparatuses, and non-transitory computer-readable medium described herein may further include operations, features, means, or instructions for determining a first pair of candidate positioning metrics based on a first hypothesis that the PRS is received from the first node, determining a second pair of candidate positioning metrics based on a second hypothesis that the PRS is received from the base station, and selecting one of the first pair of candidate positioning metrics and the second pair of candidate positioning metrics as the positioning metric based on an outlier rejection scheme, where the positioning metric is an RTT positioning metric.

Some examples of the method, apparatuses, and non-transitory computer-readable medium described herein may further include operations, features, means, or instructions for determining a geographic location of the UE based on the positioning metric.

In some examples of the method, apparatuses, and non-transitory computer-readable medium described herein, the positioning metric may be a differential measurement.

Some examples of the method, apparatuses, and non-transitory computer-readable medium described herein may further include operations, features, means, or instructions for transmitting an indication to avoid using a reference signal transmitted by the first node or the base station when generating the differential measurement.

In some examples of the method, apparatuses, and non-transitory computer-readable medium described herein, the indication may be an LPP message, an RRC message, a MAC-CE, or DCI.

In some examples of the method, apparatuses, and non-transitory computer-readable medium described herein, the location server may be co-located with the base station.

A method of wireless communications by a base station is described. The method may include receiving a positioning metric from a UE that is generated based on a PRS and positioning assistance data (e.g., almanac information) that indicates that a first node operates as a relay for the base station and transmitting the positioning metric to a location server.

An apparatus for wireless communications by a base station is described. The apparatus may include a processor, memory in electronic communication with the processor, and instructions stored in the memory. The instructions may be executable by the processor to cause the apparatus to receive a positioning metric from a UE that is generated based on a PRS and positioning assistance data (e.g., almanac information) that indicates that a first node operates as a relay for the base station and to transmit the positioning metric to a location server.

Another apparatus for wireless communications by a base station is described. The apparatus may include means for receiving a positioning metric from a UE that is generated based on a PRS and positioning assistance data (e.g., almanac information) that indicates that a first node operates as a relay for the base station and means for transmitting the positioning metric to a location server.

A non-transitory computer-readable medium storing code for wireless communications by a base station is described. The code may include instructions executable by a processor to receive a positioning metric from a UE that is generated based on a PRS and positioning assistance data (e.g., almanac information) that indicates that a first node operates as a relay for the base station and to transmit the positioning metric to a location server.

Some examples of the method, apparatuses, and non-transitory computer-readable medium described herein may further include operations, features, means, or instructions for transmitting an indication to avoid using a second PRS transmitted by the first node or the base station when generating the positioning metric that includes a differential measurement.

In some examples of the method, apparatuses, and non-transitory computer-readable medium described herein, the indication may be an LPP message, an RRC message, a MAC-CE, or DCI.

In some examples of the method, apparatuses, and non-transitory computer-readable medium described herein, the base station may be co-located with the location server.

Some examples of the method, apparatuses, and non-transitory computer-readable medium described herein may further include operations, features, means, or instructions for transmitting the PRS.

DETAILED DESCRIPTION

Figure 1:
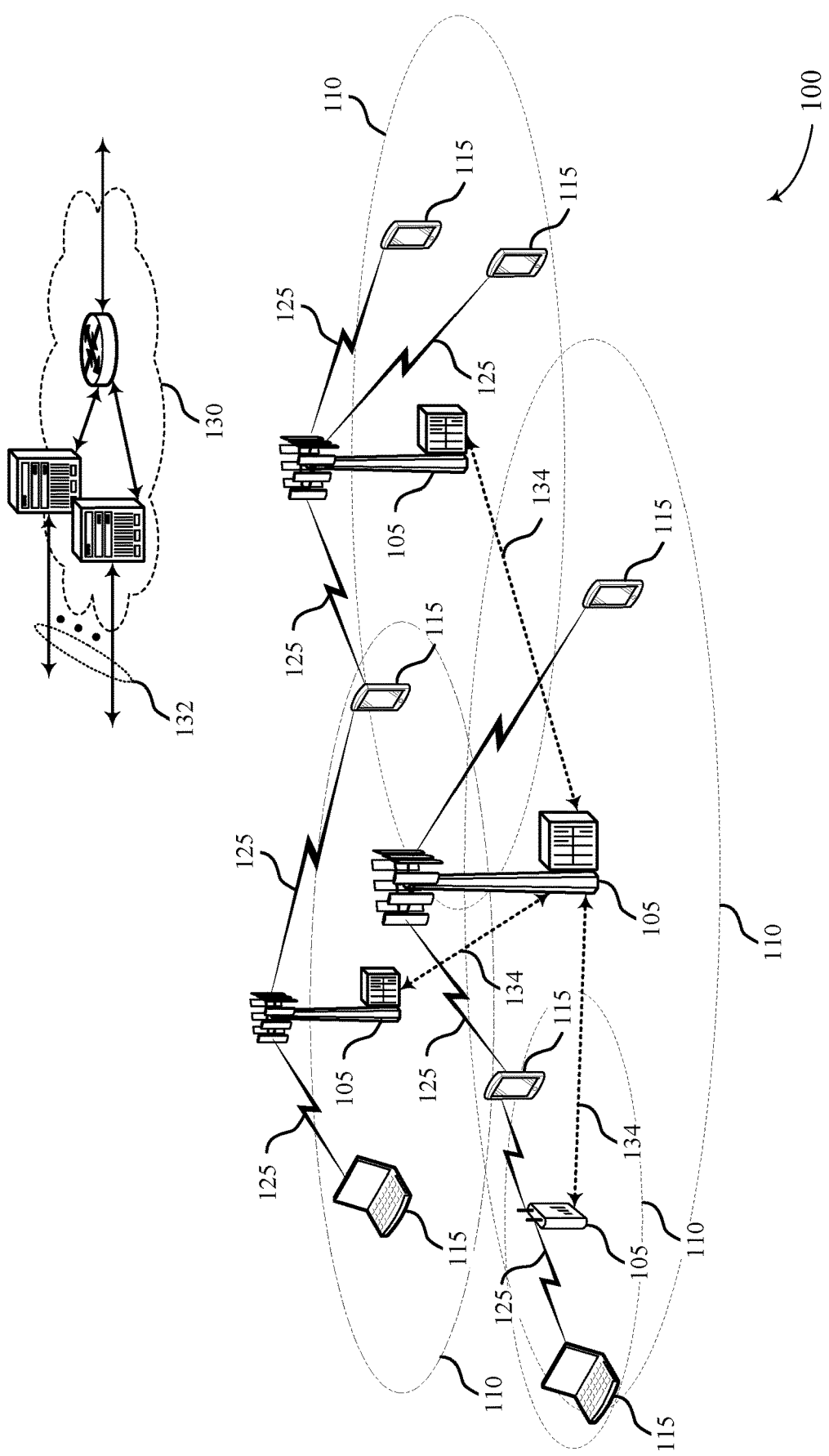
FIG. 1 illustrates an example of a system for wireless communications in accordance with aspects of the present disclosure.

In some wireless communication systems, relay nodes may be used to increase or extend coverage for data transmission and reception, for example, in hard to reach coverage areas. However, the use of relay nodes in wireless communication systems may interfere with positioning functionality, for example, in cases where a user equipment (UE) can receive signals from either a relay node and/or a base station. For example, a UE receiving a positioning signal (e.g., a positioning reference signal (PRS)) may be unable to determine whether the positioning signal is coming from a donor node (e.g., a donor base station or donor cell) or from a relay node. As described herein, a position (e.g., location) of the UE may be determined when communications between the UE and a base station are routed through a relay node based on positioning assistance data (e.g., almanac information) that the UE uses to determine whether a PRS is received from the base station or the relay node. The UE may then transmit associated information (e.g., a position metric) based on this determination to a location server, where the location server then uses this associated information for determining the location of the UE.

In some cases, the location server may be a core network entity, such as an enhanced serving mobile location center (eSMLC) or a location management function (LMF), or a same functionality may be implemented in the Radio Access Network (RAN). For example, the functionality of the location server may implemented in a base station (e.g., a giga-NodeB (gNB)) or a location measurement unit (LMU), which may be included within or colocated with a base station. Additionally or alternatively, in a UE-based positioning technique, the UE may be provided with relevant positioning assistance data by, for example, a location server, such that the UE may determine its own position using this information together with positioning information measured by the UE (such as a positioning metric). The UE determining its own position may avoid the need for the UE to transmit its positioning measurements back to the network (e.g., via a location server, via a base station, etc.).

Additionally, the location server may store the positioning assistance data (e.g., almanac information, such as a base station almanac (BSA), PRS configuration information, etc.) that contains positioning-related information (e.g., cell identifiers, UE identifiers, geographic locations, beam identifiers, backhaul beams, access beams, node types, etc.) about different base stations and relay nodes in the wireless communications system. The location server may transmit this positioning assistance data to the UE via the base station and the relay node (e.g., via a Long Term Evolution (LTE) positioning protocol (LPP) message and connection with the UE). After receiving a PRS, the UE may use the positioning assistance data to determine whether the PRSs are received from the base station or the relay node. Accordingly, the UE may generate a positioning metric based on determining whether the PRSs are received from the base station or the relay node, where the positioning metric includes a detected time of arrival, an angle of arrival, or both. Subsequently, the UE may transmit the positioning metric to the location server (e.g., via the relay node and/or the base station), where the location server determines the location of the UE based on the positioning metric.

In some cases, the UE may determine whether the PRS is received from the base station or the relay node based on a delay associated with the PRS (e.g., a PRS routed through the relay node may have a longer delay time); an orientation, attenuation, or both for an angle of incidence for the relay node based on the positioning-related information in the almanac information; a PRS identifier or scrambling code associated with the PRS that identifies which of the base station or relay node are transmitting the PRS; or a combination thereof. Additionally or alternatively, the UE may determine the position metric based on hypotheses that the PRS is received from either the base station or the relay node, where the UE determines one or more candidate positioning metrics (e.g., or pairs of candidate positioning metrics) based on the hypotheses. The UE may then select a candidate positioning metric from the hypotheses as the positioning metric (e.g., a round trip time (RTT) positioning metric) based on an outlier rejection scheme. Additionally or alternatively, the UE may report all the candidate positioning metrics to the location server, which may then perform the outlier rejection scheme.

In some cases, the location server and/or the base station may perform a similar determination process to generate a position metric based on receiving a PRS from the UE and using the almanac information. When the position metric is generated by the base station or is received by the base station from a UE that generates the position metric, the base station may then transmit the position metric to the location server to enable the location server to determine the location (e.g., position) of the UE.

Aspects of the disclosure are initially described in the context of a wireless communications system. Additionally, aspects of the disclosure are illustrated by an additional wireless communications system and a process flow example. Aspects of the disclosure are further illustrated by and described with reference to apparatus diagrams, system diagrams, and flowcharts that relate to positioning with relays.

FIG. 1 illustrates an example of a wireless communications system 100 that supports positioning with relays in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A serving base station 105 (or a location server) of a UE 115 may keep track of the location or position of the UE 115. Various positioning techniques may be used to track the UE 115. In some examples, the UE 115 may be configured to transmit one or more uplink PRSs to the serving base station 105 and one or more neighboring base stations 105, or the UE 115 may be configured to receive one or more downlink PRSs from the serving base station 105 and one or more neighboring base stations 105. In some implementations, an uplink PRS, or downlink PRS, or both, may be transmitted on a channel defined exclusively for positioning purposes or may be transmitted on a channel or signal utilized for separate signaling (such as synchronization signals, channel-state information reference signals (CSI-RSs), sounding reference signal (SRSs), etc.), which may also be used for determining a position of the UE 115.

For an uplink PRS, the base station 105 and the neighboring base stations 105 may exchange, for example via backhaul links 134, information associated with the receipt of the uplink PRSs, such as reference signal time difference (RSTD) measurements. The network (including the location server, the base stations 105, or both) may then determine the location of the UE 115 based on the one or more uplink PRS transmissions. For downlink PRS transmissions, the UE 115 may receive a PRS (or other signaling) from each of one or more base stations 105. In some examples, the UE 115 may estimate its position based on measurements, for example, RSTD measurements performed by the UE 115 on the downlink PRS transmissions.

Additionally or alternatively, the UE 115 may transmit measurement reports for the one or more received downlink PRSs to a serving base station 105 (which may forward the measurement reports to the location server). Generally, a positioning technique may be UE-based or UE-assisted. In UE-based positioning, the UE 115 may perform the position estimation without feeding back RSTD measurements to the network (for example, via a base station 105). In UE-assisted positioning, the UE 115 may provide the RSTD measurements, and the network (e.g., the serving base station 105, the location server, etc.) may perform the positioning estimation using the RSTD measurements. A UE 115 may be configured for a UE-based mode, a UE-assisted mode, or a mode which incorporates aspects of both. The positioning mode may be selected based on a connection initialization configuration, downlink control information (DCI), a MAC control element (CE), etc.

In some wireless communication systems, relay nodes may be used to increase or extend coverage for data transmission and reception, for example, in hard to reach coverage areas. However, the use of relay nodes in wireless communication systems may interfere with positioning functionality, for example, in cases where a UE 115 can receive signals from either a relay node and/or a base station 105. For example, a UE 115 receiving a positioning signal (e.g., a PRS) may be unable to determine whether the positioning signal is coming from a donor node (e.g., a donor base station 105 or donor cell) or from a relay node (e.g., a passive or active relay).

Wireless communications system 100 may support efficient techniques for determining a position of a UE 115 when communications between the UE 115 and a base station 105 are routed through a relay node. For example, the UE 115 may determine whether communications (e.g., a PRS) are received from the base station 105 or from the relay node based on positioning assistance data (e.g., almanac information, PRS configuration information, etc.) that contains positioning-related information (e.g., cell identifiers, UE identifiers, geographic locations, beam identifiers, backhaul beams, access beams, node types, etc.) about different base stations and relay nodes in the wireless communications system. The UE 115 may then transmit a position metric (e.g., information associated with its position) based on this determination to a location server (e.g., through a base station 105), where the location server uses this position metric for determining the location of the UE 115. Additionally or alternatively, the base station 105 may use the positioning assistance data to determine whether an uplink transmission (e.g., uplink PRS) is received directly from the UE 115 or via the relay node and may generate a position metric to transmit to the location server, where the location server then uses the position metric for determining the location of the UE 115. In some cases, the positioning metric may include a detected time of arrival, an angle of arrival, or both.

In some cases, the UE 115 and/or the base station 105 may determine whether respective communications (e.g., a downlink PRS for the UE 115 or an uplink PRS for the base station 105) are received from the other wireless device (e.g., the base station 105 or the UE 115, respectively) or from the relay node based on a delay associated with the communications (e.g., a PRS routed through the relay node may have a longer delay time); an orientation, attenuation, or both for an angle of incidence for the relay node based on the positioning-related information in the almanac information; a PRS identifier or scrambling code associated with the PRS that identifies which of the wireless device or relay node are transmitting the PRS; or a combination thereof. Additionally or alternatively, the UE 115 and/or base station 105 may determine the position metric based on one or more hypotheses that the PRS is received from either the other wireless device or the relay node, where the UE 115 and/or base station 105 determines one or more candidate positioning metrics (e.g., or pairs of candidate positioning metrics) based on the hypotheses. The UE 115 and/or base station 105 may then select a candidate positioning metric from the hypotheses as the positioning metric (e.g., an RTT positioning metric) based on an outlier rejection scheme.

Figure 2:
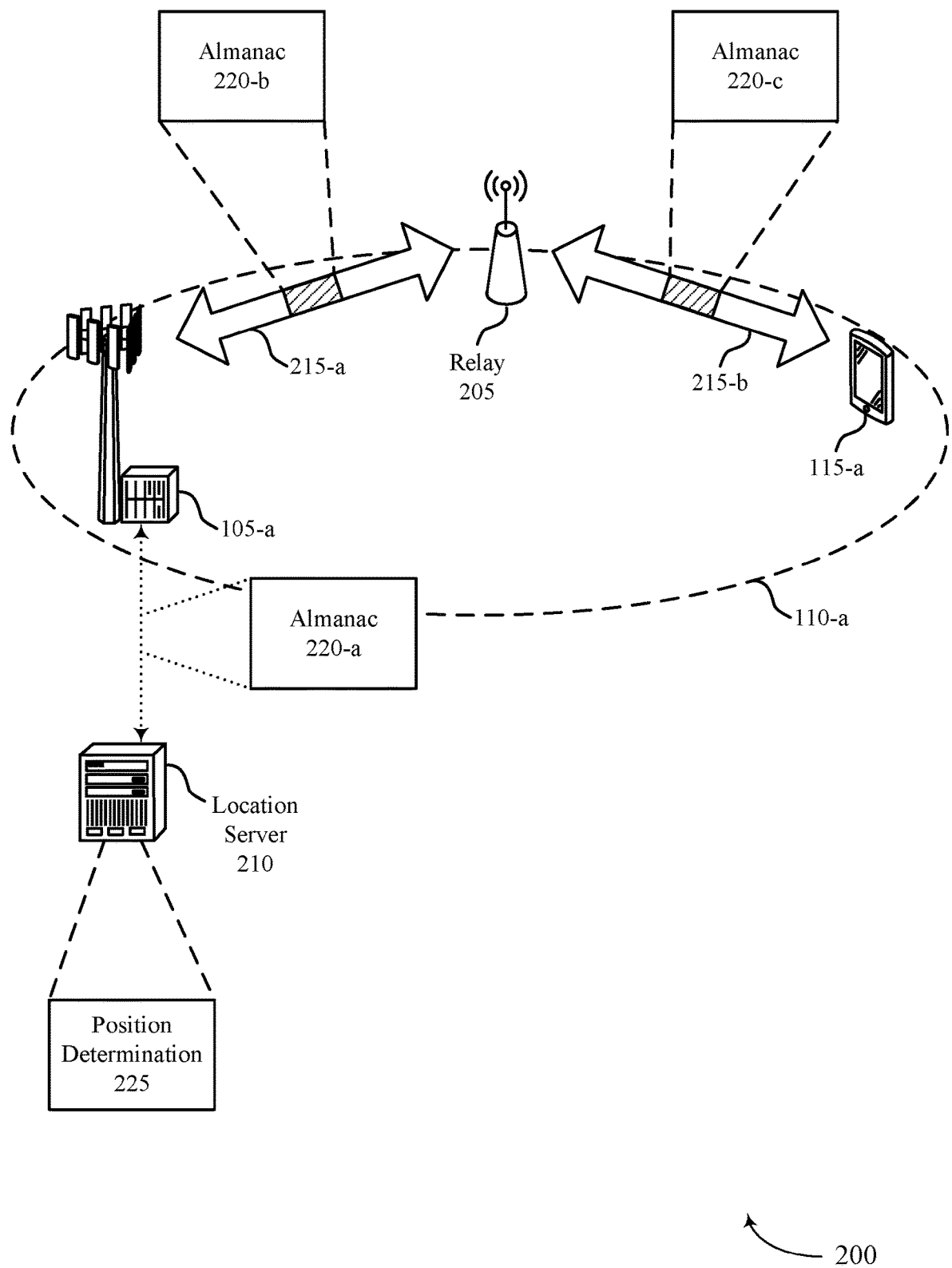
FIG. 2 illustrates an example of a wireless communications system in accordance with aspects of the present disclosure.

FIG. 2 illustrates an example of a wireless communications system 200 that supports positioning with relays in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. In some cases, UE 115-*a* may be at an edge of a geographic coverage area 110-*a* associated with base station 105-*a* or in a similar hard to reach region of geographic coverage area 110-*a* (e.g., a number of physical obstacles in the way) that hinders direct communications between UE 115-*a* and base station 105-*a*. Additionally or alternatively, although not shown, UE 115-*a* may be outside of geographic coverage area 110-*a*, reducing the ability of base station 105-*a* to effectively communicate with UE 115-*a*. Accordingly, wireless communications system 200 may also include a relay 205 (e.g., a relay node) that both base station 105-*a* and UE 115-*a* can utilize to route respective communications (e.g., downlink transmissions and/or uplink transmissions) through, increasing the geographic coverage area 110-*a* of base station 105-*a* for the different communications. Base station 105-*a* and relay 205 may communicate on resources of a carrier 215-*a*, and relay 205 and UE 115-*a* may communicate on resources of a carrier 215-*b*. In some cases, separate relays may be used for uplink and for downlink transmissions.

In some implementations, relay 205 may be a passive relay or an active relay. For example, a passive relay may include forwarding relays (e.g., reflectors) and amplify-and-forward relays (e.g., repeaters). At a radio frequency (RF) level, passive relays may capture and retransmit signals, with or without amplifying the signals prior to retransmission. The use of passive relays may reduce the number of active nodes required for wireless communications system 200. For example, reflectors strategically located in a factory-automation scenario may reduce the required number of more active (and thus more expensive) nodes such as base stations 105 (e.g., gNBs), thereby reducing an overall cost for the factory-automation.

Additionally or alternatively, active relays may decode and forward signals. For example, an active relay may act as a UE 115, receive signals from a base station 105 (e.g., or an additional UE 115), decode the information (e.g., to determine which UE 115 to forward the information to, determine what information to retransmit to the UE 115, etc.), encode the information again (e.g., based on specific encoding or scrambling sequences at the active relay), and forward the signal and information to the UE 115. Additionally or alternatively, the active relay may act as a base station 105 and similarly retransmit (e.g., rebroadcast) any received signals from a UE 115 to additional base stations 105 (e.g., or additional UEs 115).

However, the use of relay 205 in wireless communications system 200 may interfere with positioning functionality, for example, in cases where UE 115-*a* may receive signals from relay 205, base station 105-*a*, or both (e.g., or an additional UE 115). For example, UE 115-*a* may receive a positioning signal (e.g., a PRS) and may be unable to determine whether the positioning signal is coming from a donor node (e.g., base station 105-*a*, another donor base station, an additional UE 115, or a donor cell) or from relay 205. As described herein, different schemes may be outlined that improve a positioning determination of UE 115-*a* by UE 115-*a* and/or base station 105-*a* in the presence of relay 205 (e.g., a relay node).

In some cases, wireless communications system 200 may also include a location server 210 that keeps track of positions of wireless devices in the system (e.g., including UE 115-*a*, base station 105-*a*, and relay 205). Location server 210 may know the locations of base station 105-*a* and relay 205 at all times based on their static locations but may need additional information about UE 115-*a* (e.g., gathered through downlink and/or uplink PRS transmissions) to determine the location of UE 115-*a* (e.g., via a position determination 225). Accordingly, location server 210 may store position-related information for the base stations 105 (e.g., including base station 105-*a* and relay 205) in wireless communications system 200 in an almanac 220 (e.g., a BSA, PRS configuration information, etc.). In some cases, in the example depicted in FIG. 2, the almanac 220 may be an example of positioning assistance data. For example, the almanac 220 may include positioning-related information on the base stations 105 in wireless communications system 200 such as a physical (e.g., geographic) location, antenna array/panel configuration and orientation, beam patterns (e.g., backhaul beams and/or access beams), etc., for each base station 105. Additionally, the almanac 220 may contain information identifying a node 'type' for each base station 105. For example, the node 'type' may indicate whether a base station 105 is a 'regular' (e.g., macro or micro) base station 105 (e.g., gNB), a home base station 105 (e.g., or gNB), or a relay (e.g., an active or passive relay or repeater or reflector relay, respectively). In some cases, location server 210 may be co-located with base station 105-*a* (e.g., located within base station 105-*a*).

For relay nodes (e.g., including relay 205), the almanac 220 may include additional information about the relay node than only the node 'type.' For example, for a relay intended to extend coverage of one or more particular cell(s) (e.g., geographic coverage area 110-*a* of base station 105-*a*), the almanac 220 may include information about the cell(s). The information about the cell(s) may include identifications of the cell(s) (e.g., cell-IDs), geographical location of the relay nodes and cell(s), identifications of specific beams (e.g., specific beam-IDs) of donor cells targeted for coverage extension, or a combination thereof. In some cases, the almanac 220 may include a UE identifier (e.g., when a UE 115 is acting as a relay for a base station 105, where the location/position of the UE 115 is known and indicated in the almanac information). Additionally, the almanac 220 may include information indicating antenna array/panel configuration and/or orientation for the relay nodes, as well as information indicating beam patterns and beam gains of the relay node for both backhaul links (e.g., relay 205 to base station 105-*a* on carrier 215-*a* or an additional parent/donor base station 105) and access links (e.g., relay 205 to UE 115-*a* on carrier 215-*b* or an additional end UE 115).

In some cases, if relay 205 is a fully passive relay (e.g., a reflector), the almanac 220 may include an orientation, expected attenuation, or both for different angles of incidence. Additionally or alternatively, if relay 205 is a repeater or an active relay, the almanac 220 may include a delay introduced by the repeater or active relay. For an amplify-and-forward type repeater (e.g., an RF repeater), the introduced delay may be small (e.g., based on increasing or decreasing the power of the transmission but not decoding any information included in a data transmission, in which case the delay includes RF front-end and amplifier delays at the receiver and transmitter) but may be used for determining positioning (e.g., precise positioning) of UE 115-*a*. Additionally or alternatively, for a decode-and-forward type repeater, the introduced delay may be relatively much larger than the amplify-and-forward type repeater (e.g., based on decoding the information in the data transmission before forwarding the data transmission to a particular UE 115) and may be taken into account for determining positioning (e.g., precise positioning) of UE 115-*a*.

In some cases, UE 115-*a* may obtain the almanac 220 via a system information block (SIB) message, a master information block (MIB) message, or a dedicated RRC configuration. For example, location server 210 may first transmit an almanac 220-*a* to base station 105-*a*. Subsequently, base station 105-*a* may then transmit an almanac 220-*b* to relay 205 on carrier 215-*a*, where relay 205 then retransmits (e.g., forwards) an almanac 220-*c* to UE 115-*a* on carrier 215-*b*. In some cases, location server 210 may transmit the almanac 220 to UE 115-*a* for a UE-based positioning technique as described above with reference to FIG. 1. Accordingly, the almanac 220 may be transmitted directly from location server 210 to UE 115-*a* via base station 105-*a* (e.g., and relay 205), where base station 105-*a* may or may not be able to read the position-related information in the almanac 220. For example, location server 210 and UE 115-*a* may include an LPP connection that is a direct connection between the two devices, where the connection travels through base station 105-*a*, but base station 105-*a* may or may not be able to read data on the connection.

As noted herein, in wireless communications system 200, the utilization of relay nodes (e.g., relay 205) can result in confusion and ambiguities at either end of the communications between base station 105-*a* and UE 115-*a* (e.g., a PRS receiver). For example, when UE 115-*a* detects or receives a downlink PRS in a communication area (e.g., geographic coverage area 110-*a*) including one or more base stations 105 (e.g., base station 105-*a* or another source/donor node) and one or more relay nodes (e.g., relay 205), UE 115-*a* may be unable to determine whether the downlink PRS is from base station 105-*a* or from relay 205. In some cases, if UE 115-*a* receives a downlink PRS by line-of-sight (LOS) from both base station 105-*a* and relay 205 (e.g., no obstacles or reflected paths from other reflectors besides the relay are present between UE 115-*a* and base station 105-*a* or relay 205), UE 115-*a* may identify a later received downlink PRS as coming from relay 205 (e.g., a PRS routed through relay 205 will take longer to reach UE 115-*a* than a PRS received directly from base station 105-*a*). However, if one or both of downlink PRSs received from base station 105-*a* and relay 205 are non-LOS (NLOS) or blocked, UE 115-*a* may be unable to differentiate between downlink PRSs as coming from base station 105-*a* or relay 205.

Additionally, further ambiguities may apply to both detected time-of-arrivals and angle of arrivals for downlink PRSs received from base station 105-*a* and/or relay 205, especially if relay 205 is a passive relay (e.g., repeater/reflector). If relay 205 is an active relay, relay 205 may transmit the same or a differentiated PRS (e.g., including a different signature, such as a different PRS-ID, a different scrambling code, etc., than base station 105-*a* would use). For example, relay 205 may transmit the PRS similar to a PRS transmission in a Remote Radio Head (RRH) deployment when relay 205 is an active relay, where each distinct geographical RRH location has its own PRS-ID. If relay 205 (e.g., as an active relay) uses the same PRS as base station 105-*a* (e.g., a donor base station), then the same confusion may arise as with passive relays (i.e., UE 115-*a* receiving the PRS may be unable to determine whether the PRS is from relay 205 or from base station 105-*a* based on same identifiers of the PRS). Additionally or alternatively, the above ambiguities may also occur in uplink PRS transmissions. For example, for base station 105-*a* detecting and/or receiving an uplink PRS, base station 105-*a* may be unable to determine whether the detected/received uplink PRS is from UE 115-*a* or from relay 205.

As described herein, when resolving the above described ambiguities, a positioning determination technique using PRS as described above with reference to FIG. 1 may be applied. For example, if UE 115-*a* identifies (e.g., knows) that a downlink PRS path is from relay 205 (e.g., a repeater), UE 115-*a* may accurately calculate an arrival time as from relay 205. That is, the UE may calculate the arrival time from relay 205 as shown below in Equation 1:

Arrival Time from Relay=Total Arrival Time−('Base Station-to-Relay' Propagation Time+Repeater Delay)     (1)

This arrival time may then be treated as an arrival time from a separate base station 105 (e.g., gNB) that is in sync with base station 105-*a* (e.g., a donor base station 105). Similarly, if base station 105-*a* (e.g., a donor base station) identifies that an uplink PRS path is from relay 205 (e.g., a repeater), base station 105-*a* may find or calculate the arrival time at relay 205. In some cases, for an RTT based positioning, the conventional PRS positioning determination techniques may apply if both downlink and uplink transmissions follow a same path (e.g., either the direct path or the path via relay 205).

Additionally, base station 105-*a* and UE 115-*a* may use position-related information for the relay nodes in the almanac 220 (e.g., BSA information about the relay nodes, positioning assistance data, etc.) to mitigate ambiguities when determining the position of UE 115-*a*. In some cases, a positioning engine (e.g., which is aware of the position-related information in the almanac 220) may incorporate a multiple hypothesis testing and relaying positioning metrics (e.g., position-related information about UE 115-*a*) to mitigate the ambiguities. In an example, the positioning engine may apply one or more outlier rejection schemes (such as, a random sample consensus (RANSAC)) and, subsequently, may accept or reject hypotheses to identify whether a PRS is received via base station 105-*a*/UE 115-*a* (e.g., for uplink PRSs or downlink PRSs, respectively) or via relay 205. For example, base station 105-*a* or UE 115-*a* may determine one or more position metrics based on separate hypotheses that the PRS was received from UE 115-*a* or base station 105-*a*, respectively, or from relay 205, and then determine which position metric to relay to the other wireless device based on accepting one of the hypotheses by applying an outlier rejection scheme. Further, the positioning engine may incorporate the accepted or rejected hypotheses in back calculations for deriving an RTT for the PRS transmission(s).

In some cases, the positioning engine may be located at UE 115-*a* (e.g., for a UE-based positioning technique), at a core-network (e.g., an LMF or an eSMLC), at base station 105-*a*, or at relay 205. Additionally or alternatively, for an RTT-based positioning technique, each RTT may be derived from two (2) measurements, each measurement having two (2) hypotheses in the presence of a two-way (e.g., uplink and downlink) relay 205 (e.g., thus resulting in a total of four (4) hypotheses). As described herein, the positioning engine may derive an RTT based on measurements from two (2) of the hypotheses, while discarding the measurements from the remaining two (2) hypotheses. For example, when deriving an RTT according to multiple paths (e.g., UE 115-*a* knows there is a base station 105 that includes a LOS manner for receiving a downlink PRS and there is relay 205 associated with base station 105-*a* that includes a NLOS manner for receiving a downlink PRS), the positioning engine may be unable to determine whether signals are from the base station 105 with the LOS or are from relay 205 and, therefore, may test both sets of hypotheses.

Additionally, one or more base stations 105 may be avoided for use as reference for differential measurements when determining a position of UE 115-*a*, where the one or more base stations 105 are subject to confusions. In some cases, these differential measurements may include time difference of arrivals (TDOAs) between base station 105-*a* and nearby base stations 105 (e.g., visible base stations 105), a differential RTT, a differential angle-based measurement, etc. When these one or more base stations 105 are used as reference, the ambiguities may enter into all the differential measurements (e.g., time-differences), and location server 210 may prefer to avoid these base stations 105 that cause confusion for determining the position of UE 115-*a*. The base stations 105 to be avoided may either be avoided altogether or may be used subject to a restriction that they are not used as reference for differential measurements.

Accordingly, these one or more base stations 105 to avoid (e.g., for determining the position of UE 115-*a*) may be indicated to the wireless device performing the differencing option (e.g., UE 115-*a* for downlink PRSs, base station 105-*a* for uplink PRSs, relay 205, location server 210, etc.). For example, if UE 115-*a* is the wireless device performing the differencing option, UE 115-*a* may calculate an observed TDOA (OTDOA) (e.g., for both UE-based and UE-assisted techniques). Additionally or alternatively, for an uplink TDOA (UTDOA), a differential RTT measurement, or a differential angle-based measurement, the wireless device performing the differencing option may be the positioning engine. As such, no separate indication may be needed for differentiating PRSs received from the wireless device (e.g., UE 115-*a* or base stations 105-*a*) or from relay 205 (e.g., the positioning engine is already aware of relays in wireless communications system 200 from the almanac 220). Additionally, the indication of the one or more base stations 105 to avoid may be signaled to UE 115-*a* (e.g., from location server 210, base station 105-*a*, etc.) via an LPP connection, RRC signaling, a MAC-CE, a DCI message, or a combination thereof. In some cases, the indication of the one or more base stations 105 to avoid may be explicit or implicitly derived based on side information about presence of relays.

In some implementations, relays (e.g., including relay 205) in wireless communications system 200 may retransmit and/or amplify signals based on side-channel indications (e.g., side information). In some cases, active relays may include additional functionalities other than simply repeating a signal. For example, the active relays may include a TDD amplify-and-forward configuration (e.g., as a repeater type relay) that is unaware of a slot format indication (SFI) for any relayed transmission. Accordingly, the TDD amplify-and-forward configuration may forward all received signals (e.g., whether from a base station 105 in downlink slots or from a UE 115 in uplink slots). Additionally or alternatively, in some cases, the active relays may adjust amplification levels differently for downlink and uplink slots based on the destination for the transmitted/amplified signal (e.g., a UE 115 for downlink slots or a donor base station 105 for uplink slots).

Accordingly, base station 105-*a* (e.g., a donor base station 105) may provide one or more side-channel indications to enable the different amplification levels. The side-channel indications may include, for example, an SFI, an uplink power control for an uplink backhaul link (e.g., relay-to-base station link), configurations of control/data channels, or a combination thereof that relay 205 uses to identify the amplification level to use. Additionally, the side-channel indications may indicate for relay 205 configuration for transmitting a CSI-RS, a synchronization signal block (SSB), SRSs, PRS, or a combination thereof at the different amplification levels. By utilizing these side-channel indications, relays in wireless communications system 200 may selectively retransmit signals according to certain channels (e.g., for PRS transmissions) and configurations of the reference signals.

Although the concepts herein have been described in the context of a single relay node intended to extend the coverage of a single cell, the concepts may readily extend to cases when multiple relays are used for a single cell. For example, multiple relays may cause further ambiguities as to which relay the signals are being received from, and thus, a more stringent criterion may be used to exclude base stations known to have multiple relays from use in positioning calculations.

Figure 3:
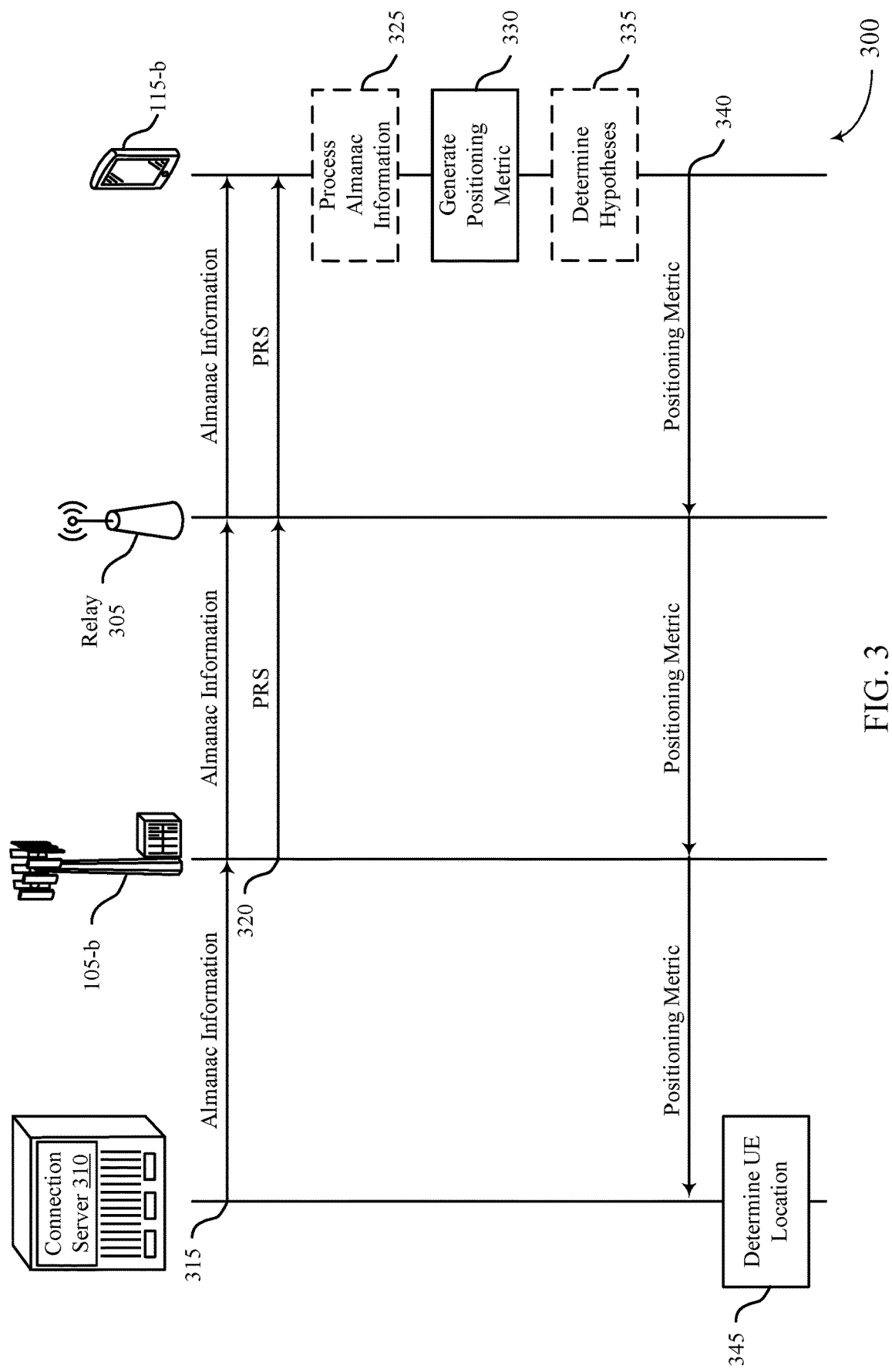
FIG. 3 illustrates an example of a process flow in accordance with aspects of the present disclosure.

FIG. 3 illustrates an example of a process flow 300 that supports positioning with relays in accordance with aspects of the present disclosure. In some examples, process flow 300 may implement aspects of wireless communications systems 100 and/or 200. Process flow 300 may include a base station 105-*b*, a UE 115-*b*, a relay 305, and a location server 310, which may be examples of corresponding base stations 105, UEs 115, relays, and location servers, respectively, as described above with reference to FIGS. 1 and 2. As described herein, techniques are outlined for determining a position of UE 115-*b* while relay 305 is used to route different transmissions between base station 105-*b* and UE 115-*b*.

In the following description of the process flow 300, the operations between UE 115-*b*, base station 105-*b*, relay 305, and location server 310 may be performed in different orders or at different times. Certain operations may also be left out of the process flow 300, or other operations may be added to the process flow 300. While UE 115-*b*, base station 105-*b*, relay 305, and location server 310 are shown performing a number of the operations of process flow 300, any wireless device may perform the operations shown. In some cases, base station 105-*b* and location server 310 may be co-located.

In some cases, relay 305 may receive a TTI format indication (e.g., a TDD configuration) that indicates that a TTI is either a downlink TTI or an uplink TTI (e.g., a slot formation indication may indicate that a slot is a downlink slot or an uplink slot). Additionally, relay 305 may receive a configuration that indicates an uplink amplification level for relaying an uplink transmission from UE 115-*b* to base station 105-*b* and a downlink amplification level for relaying a downlink transmission from base station 105-*b* to UE 115-*b*. In some cases, relay 305 may relay an uplink transmission to the base station in accordance with the uplink amplification level, a downlink transmission to the UE in accordance with the downlink amplification level, or a combination thereof.

Additionally, relay 305 may process the configuration to determine a reference signal configuration, where the transmission is relayed in accordance with the reference signal configuration. In some cases, the reference signal configuration may be a CSI-RS configuration, an SSB configuration, an SRS configuration, a PRS configuration, or any combination thereof. Additionally or alternatively, relay 305 may process the configuration to determine a subset of channels of a set of channels to relay, where the transmission is received within a first channel of the subset of channels, or may process the configuration to determine an uplink power control configuration, where the transmission is transmitted in accordance with the uplink power control configuration.

At 315, location server 310 may transmit to UE 115-*b* (via base station 105-*b* and relay 305) positioning assistance data (e.g., almanac information, PRS configuration information, etc.) that indicates that a first node operates as a relay (e.g., relay 305) for a second node that operates as a base station (e.g., base station 105-*b*). In some examples, the positioning assistance data may include almanac information, PRS configuration information, or both. In some cases, UE 115-*b* may select a third node to monitor that is not associated with a relay node based on the almanac information. Additionally, the positioning assistance data may include a first node type that indicates the first node is a relay node and a second node type that indicates that the second node is a base station.

At 320, UE 115-*b* may receive (e.g., from base station 105-*b* via relay 305, from location server 310, etc.) a PRS. In some cases, UE 115-*b* may determine that the PRS is from one of the first node or the second based on a PRS-ID or a scrambling code associated with the PRS. Additionally, in some cases, UE 115-*b* may select a third node to monitor that is not associated with a relay node based on the almanac information, where the PRS is received from the third node.

At 325, UE 115-*b* may process the positioning assistance data. For example, UE 115-*b* may process the positioning assistance data to determine one or more of a cell identifier, a UE identifier, a geographic location, or a beam identifier, for the first node, the second node, or both. Additionally or alternatively, UE 115-*b* may process the positioning assistance data to determine one or more of an antenna array configuration, an antenna panel configuration, an orientation, the first node, a beam pattern, a backhaul beam, or an access beam, for the first node, the second node, or both. In some cases, UE 115-*b* may process the positioning assistance data to determine a backhaul gain between the first and second nodes, an access gain between the first node and the UE, or both. Additionally or alternatively, UE 115-*b* may process the positioning assistance data to the first node is an active relay or a passive relay; an orientation, attenuation, or both, for at least one angle of incidence for the first node; delay introduced by the first node when relaying a transmission; or a combination thereof.

At 330, UE 115-*b* may generate a positioning metric based on the positioning assistance data and the PRS. In some cases, UE 115-*b* may determine that the PRS is received from the first node based on the positioning assistance data and may generate the positioning metric based on determining that the PRS is received from the first node. Additionally or alternatively, UE 115-*b* may determine that the PRS is received from the second node based on the positioning assistance data and may generate the positioning metric based on determining that the PRS is received from the second node. In some cases, the positioning metric may include a detected time of arrival, an angle of arrival, or both. Additionally, UE 115-*b* may determine the positioning metric based on one or more of a detected arrival time of the PRS, a propagation time, a relay delay, or any combination thereof.

In some cases, the positioning metric may be a differential measurement. Additionally, UE 115-*b* may receive an indication to avoid using the first and second nodes when generating the differential measurement. Accordingly, the indication may be an LPP message, an RRC message, a MAC-CE, or DCI. In some cases, UE 115-*b* may determine to avoid using the first and second nodes when generating the differential measurement based on receiving side information indicating presence of relay 305.

At 335, UE 115-*b* may determine a first candidate positioning metric based on a first hypothesis that the PRS is received from the first node, may determine a second candidate positioning metric based on a second hypothesis that the PRS is received from the second node, and may select one of the first candidate positioning metric and the second candidate positioning metric as the positioning metric based on an outlier rejection scheme. Additionally or alternatively, UE 115-*b* may determine a first pair of candidate positioning metrics based on a first hypothesis that the PRS is received from the first node, may determine a second pair of candidate positioning metrics based on a second hypothesis that the PRS is received from the second node, and may select one of the first pair of candidate positioning metrics and the second pair of candidate positioning metrics as the positioning metric based on an outlier rejection scheme, where the positioning metric is an RTT positioning metric.

At 340, UE 115-*b* may transmit the positioning metric to base station 105-*b* (e.g., the second node) or location server 310.

At 345, location server 310 may determine a geographic location of UE 115-*b* based on the positioning metric. Additionally or alternatively, UE 115-*b* may determine its geographic location based on the position metric as well.

While UE 115-*b* is shown determining and generating the position metric (e.g., through the almanac information, PRS, hypotheses, etc.), it is to be understood that location server 310 (and/or base station 105-*b*) may determine and generate the position metric in a similar manner.

Figure 4:
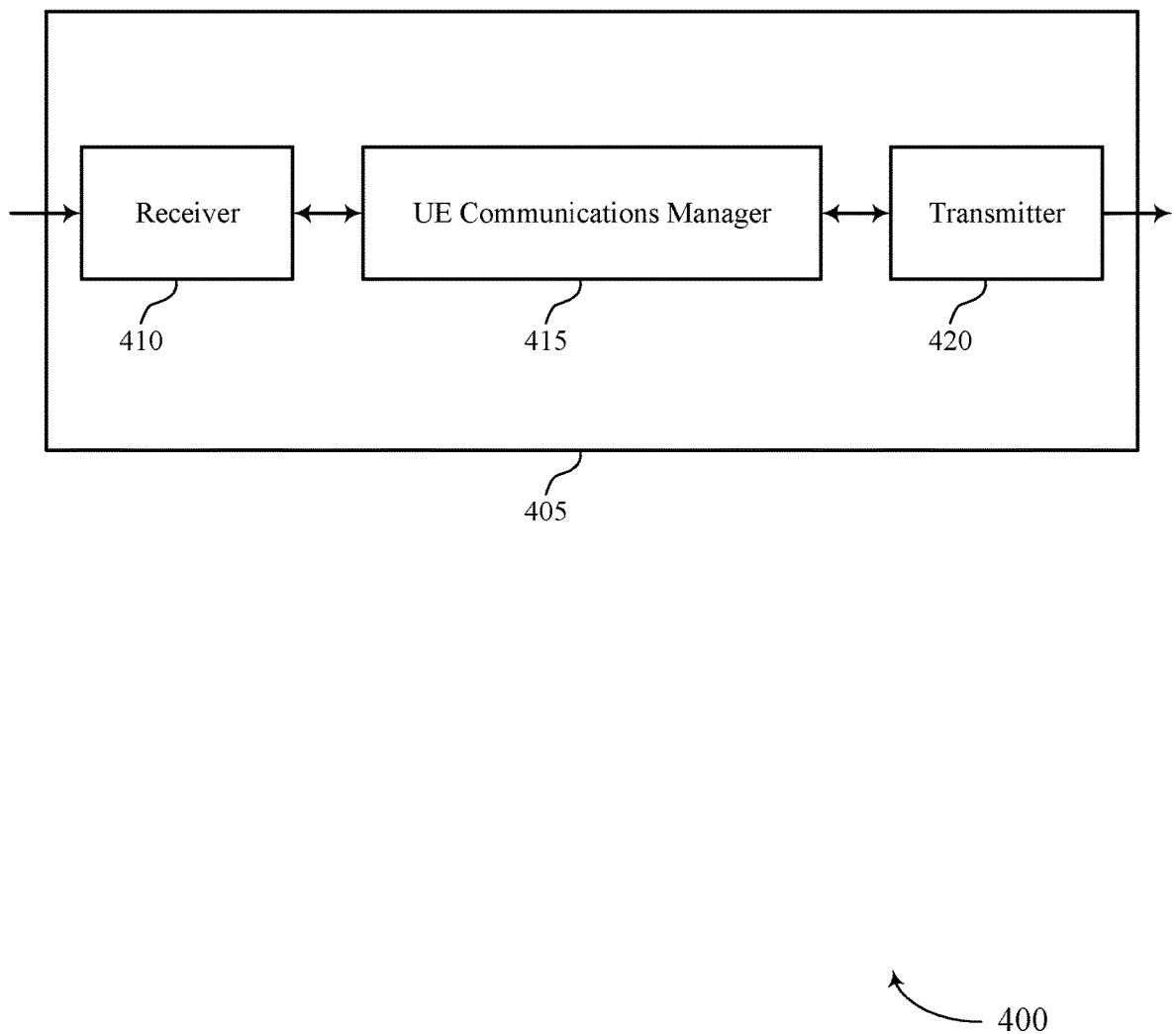
FIGS. 4 and 5 show block diagrams of devices in accordance with aspects of the present disclosure.

FIG. 4 shows a block diagram 400 of a device 405 that supports positioning with relays in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to positioning with relays, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive positioning assistance data (e.g., almanac information) that indicates that a first node operates as a relay for a second node (e.g., that operates as a base station). Additionally, the UE communications manager 415 may receive a PRS. Accordingly, the UE communications manager 415 may generate a positioning metric based on the positioning assistance data and the PRS. The UE communications manager 415 may be an example of aspects of the UE communications manager 710 described herein.

In some examples, the UE communications manager 415 as described herein may be implemented to realize one or more potential advantages for a UE 115. For example, by generating the positioning metric based on the positioning assistance data (e.g., the almanac information) and the PRS, the UE communications manager 415 may reduce signaling overhead for the UE 115 from determining the position of the UE by other techniques (e.g., positioning procedures based on transmitting PRSs, measurement reports, etc. back and forth between the UE 115 and the base station 105). Additionally, the position of the UE 115 may be determined more precisely and efficiently based on the positioning assistance data, which may cause subsequent procedures to be performed more efficiently based on a more precise/accurate location of the UE 115.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
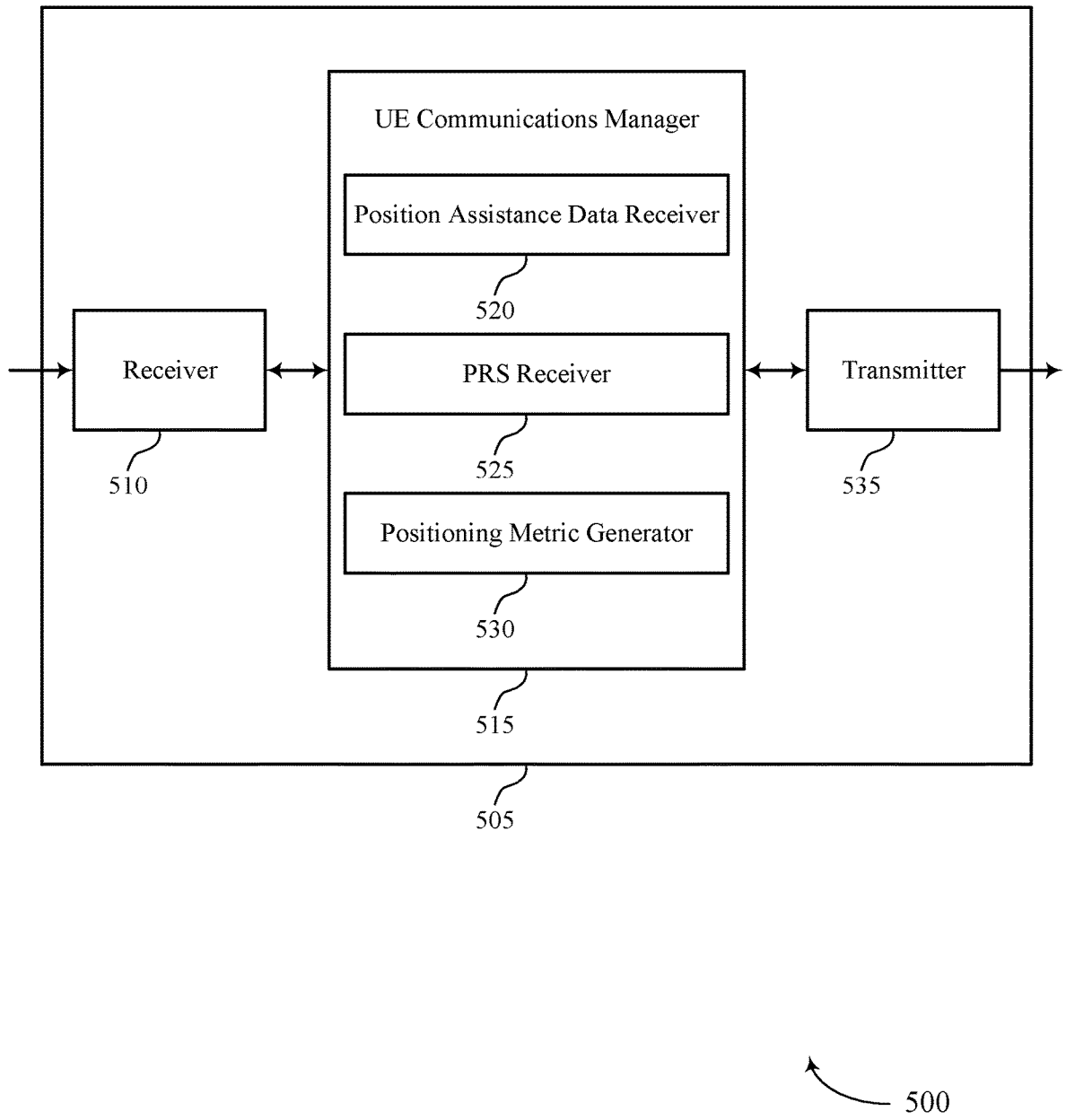

FIG. 5 shows a block diagram 500 of a device 505 that supports positioning with relays in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to positioning with relays, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include an positioning assistance data receiver 520, a PRS receiver 525, and a positioning metric generator 530. The UE communications manager 515 may be an example of aspects of the UE communications manager 710 described herein.

The positioning assistance data receiver 520 may receive positioning assistance data (e.g., almanac information) that indicates that a first node operates as a relay for a second node (e.g., that operates as a base station).

The PRS receiver 525 may receive a PRS.

The positioning metric generator 530 may generate a positioning metric based on the positioning assistance data and the PRS.

Based on techniques for receiving positioning assistance data (e.g., almanac information) indicating base stations 105 and relays, a processor of a UE 115 (for example, controlling the receiver 510, the transmitter 535, or the transceiver 720 as described with reference to FIG. 7) may more efficiently determine whether a PRS is received from a base station 105 or a relay. Prior to using the positioning assistance data, the UE 115 may not know which wireless device is transmitting the PRSs and may expend a higher amount of computational resources trying to determine as much. Additionally or alternatively, the processor of the UE 115 may use a higher signaling overhead to determine which wireless device is transmitting the PRSs (e.g., transmitting/receiving multiple messages to make the determination), thereby increasing power consumption at the UE 115 by the processor. As such, power may be saved at the processor of the UE 115 by using less computational resources and signaling overhead to determine whether a PRS is received from a base station 105 or a relay and generating a positioning metric based on this determination.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
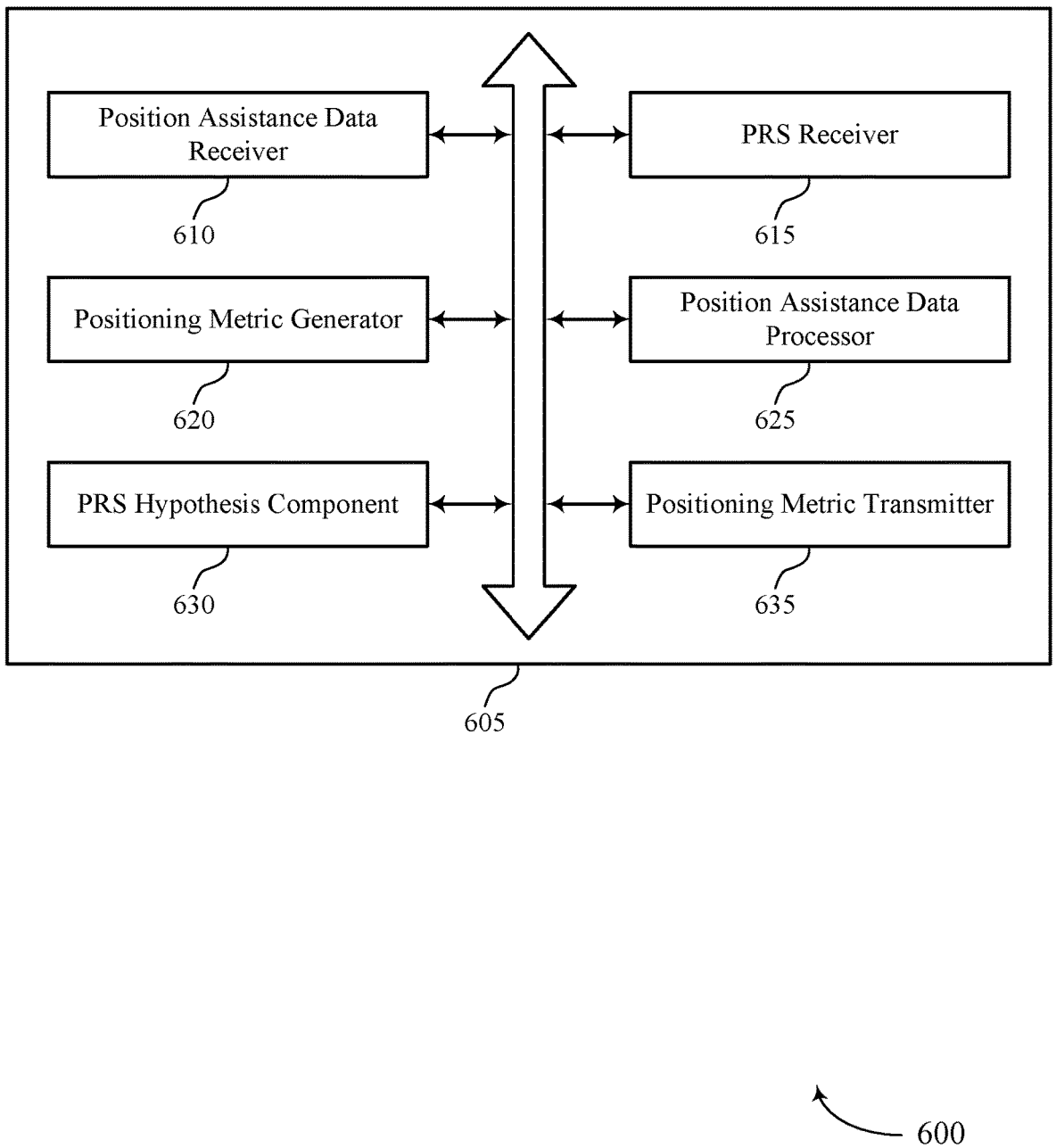
FIG. 6 shows a block diagram of a user equipment (UE) communications manager in accordance with aspects of the present disclosure.

FIG. 6 shows a block diagram 600 of a UE communications manager 605 that supports positioning with relays in accordance with aspects of the present disclosure. The UE communications manager 605 may be an example of aspects of a UE communications manager 415, a UE communications manager 515, or a UE communications manager 710 described herein. The UE communications manager 605 may include an positioning assistance data receiver 610, a PRS receiver 615, a positioning metric generator 620, an positioning assistance data processor 625, a PRS hypothesis component 630, and a positioning metric transmitter 635. Each of these modules may communicate, directly or indirectly, with one another (e.g., via one or more buses).

The positioning assistance data receiver 610 may receive positioning assistance data (e.g., almanac information) that indicates that a first node operates as a relay for a second node (e.g., that operates as a base station). In some cases, the positioning assistance data may include a first node type that indicates the first node is a relay node and a second node type that indicates that the second node is a base station.

The PRS receiver 615 may receive a PRS. In some examples, the PRS receiver 615 may select a third node to monitor that is not associated with a relay node based on the positioning assistance data, where the PRS is received from the third node. Additionally, the PRS receiver 615 may determine that the PRS is from one of the first node or the second based on a PRS identifier or a scrambling code associated with the PRS.

The positioning metric generator 620 may generate a positioning metric based on the positioning assistance data and the PRS. In some cases, the positioning metric may include a detected time of arrival, an angle of arrival, or both. In some examples, the positioning metric generator 620 may determine that the PRS is received from the first node based on the positioning assistance data and may generate the positioning metric based on determining that the PRS is received from the first node. Additionally or alternatively, the positioning metric generator 620 may determine that the PRS is received from the second node based on the positioning assistance data and may generate the positioning metric based on determining that the PRS is received from the second node. In some examples, the positioning metric generator 620 may determine the positioning metric based on one or more of a detected arrival time of the PRS, a propagation time, a relay delay, or any combination thereof. In some examples, the positioning metric generator 620 may determine a geographic location of the UE based on the positioning metric.

In some cases, the positioning metric may be a differential measurement. Accordingly, the positioning metric generator 620 may receive an indication to avoid using the first and second nodes when generating the differential measurement and may determine to avoid using the first and second nodes when generating the differential measurement based on receiving side information indicating presence of a relay. In some cases, the indication may be an LPP message, a RRC message, a MAC-CE, or DCI.

The positioning assistance data processor 625 may process the positioning assistance data to determine one or more of a cell identifier, a UE identifier, a geographic location, or a beam identifier, for the first node, the second node, or both. In some examples, the positioning assistance data processor 625 may process the positioning assistance data to determine one or more of an antenna array configuration, an antenna panel configuration, an orientation, the first node, a beam pattern, a backhaul beam, or an access beam, for the first node, the second node, or both. Additionally or alternatively, the positioning assistance data processor 625 may process the positioning assistance data to determine a backhaul gain between the first and second nodes, an access gain between the first node and the UE, or both. In some examples, the positioning assistance data processor 625 may process the positioning assistance data to determine the first node is an active relay or a passive relay. Additionally or alternatively, the positioning assistance data processor 625 may process the positioning assistance data to determine an orientation, attenuation, or both, for at least one angle of incidence for the first node. In some examples, the positioning assistance data processor 625 may process the positioning assistance data to determine delay introduced by the first node when relaying a transmission.

The PRS hypothesis component 630 may determine a first candidate positioning metric based on a first hypothesis that the PRS is received from the first node, may determine a second candidate positioning metric based on a second hypothesis that the PRS is received from the second node, and may select one of the first candidate positioning metric and the second candidate positioning metric as the positioning metric based on an outlier rejection scheme. Additionally or alternatively, the PRS hypothesis component 630 may determine a first pair of candidate positioning metrics based on a first hypothesis that the PRS is received from the first node, may determine a second pair of candidate positioning metrics based on a second hypothesis that the PRS is received from the second node, and may select one of the first pair of candidate positioning metrics and the second pair of candidate positioning metrics as the positioning metric based on an outlier rejection scheme, where the positioning metric is an RTT positioning metric.

The positioning metric transmitter 635 may transmit the positioning metric to the second node or a location server.

Figure 7:
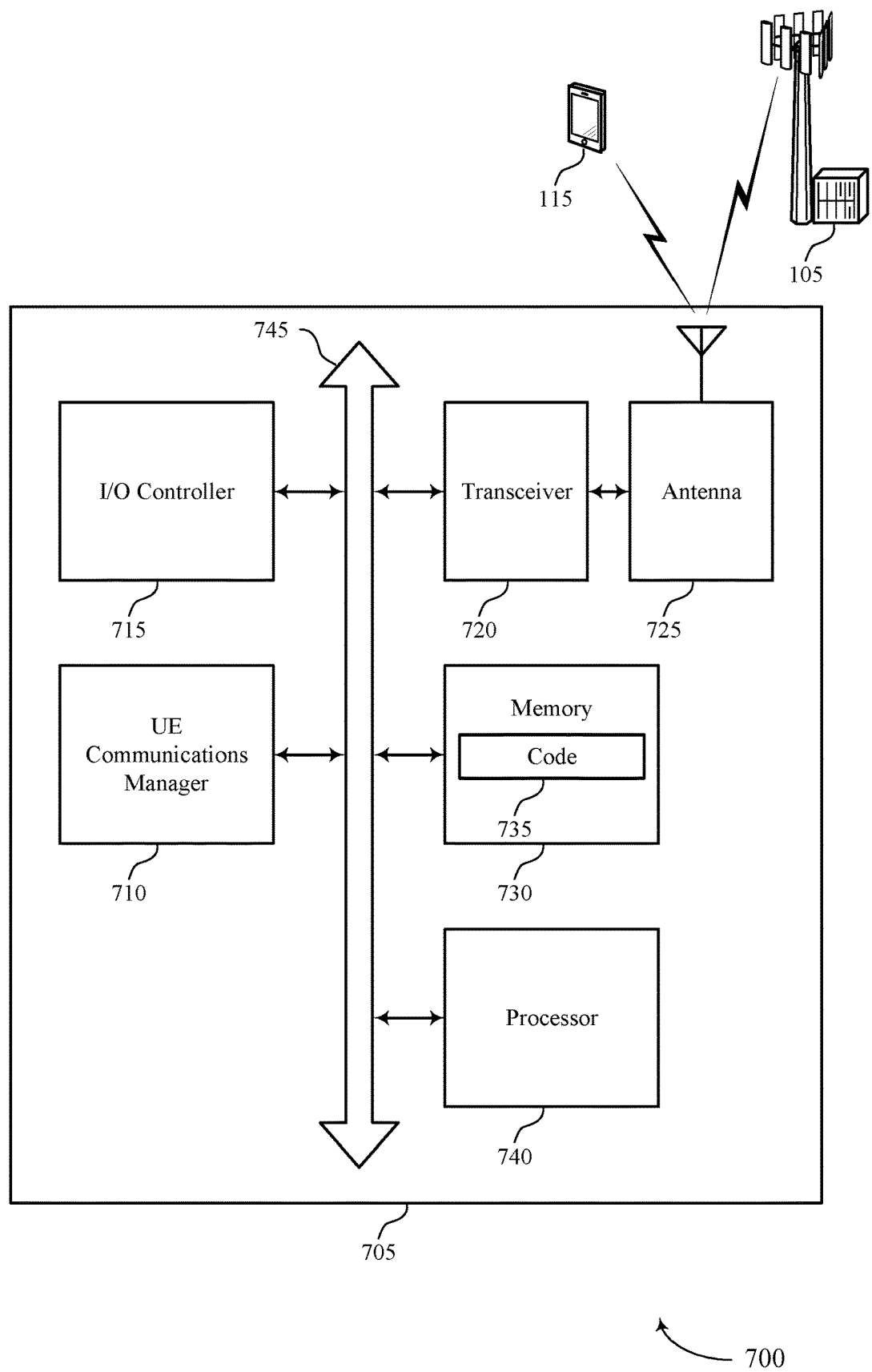
FIG. 7 shows a diagram of a system including a device in accordance with aspects of the present disclosure.

FIG. 7 shows a diagram of a system 700 including a device 705 that supports positioning with relays in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may receive positioning assistance data (e.g., almanac information) that indicates that a first node operates as a relay for a second node (e.g., that operates as a base station). Additionally, the UE communications manager 710 may receive a PRS. Accordingly, the UE communications manager 710 may generate a positioning metric based on the positioning assistance data and the PRS.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting positioning with relays).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
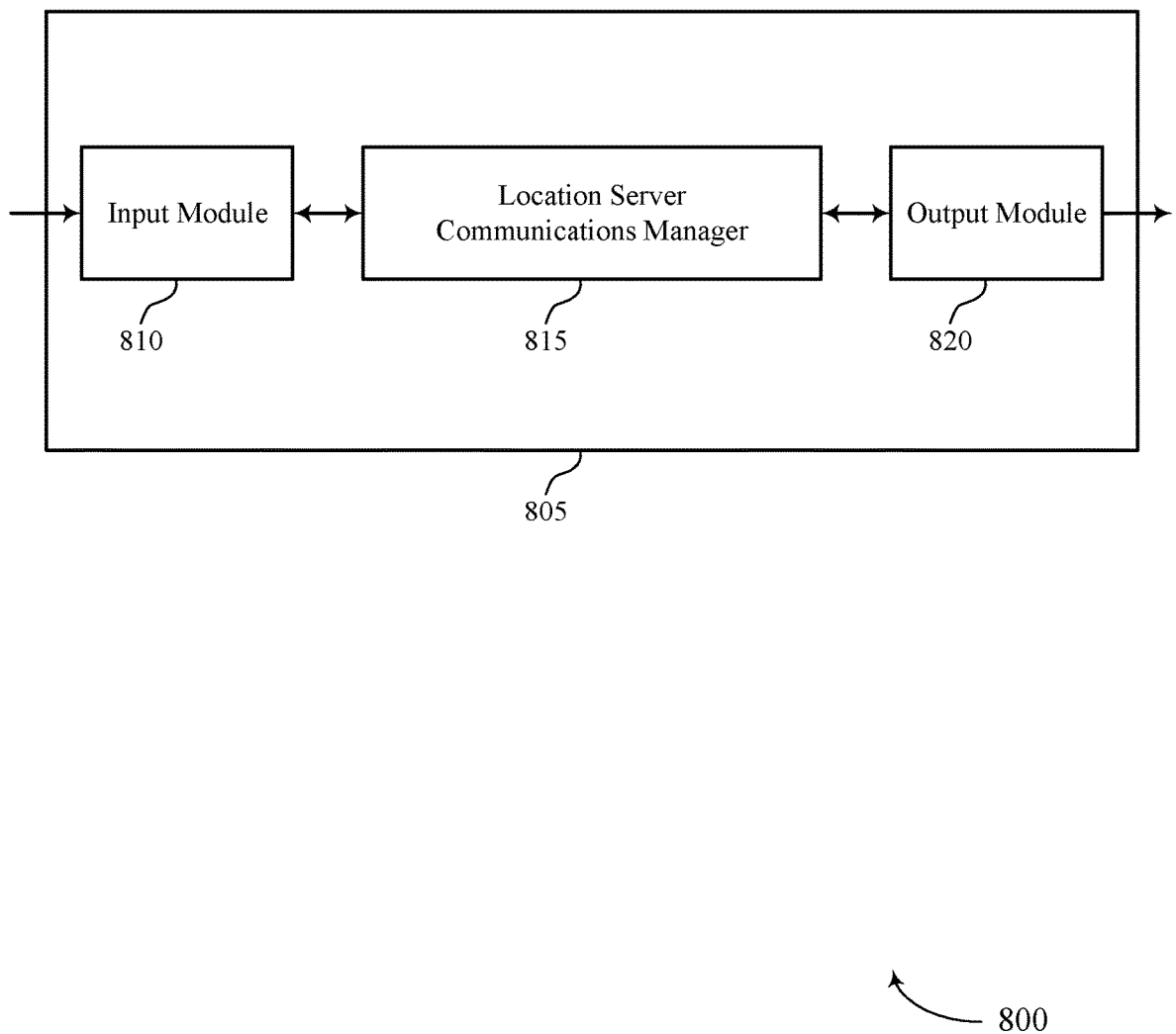
FIGS. 8 and 9 show block diagrams of devices in accordance with aspects of the present disclosure.

FIG. 8 shows a block diagram 800 of a device 805 that supports positioning with relays in accordance with aspects of the present disclosure. The device 805 may be an example of aspects of a location server as described herein. The device 805 may include an input module 810, a location server communications manager 815, and an output module 820. The device 805 may also include a processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the location server communications manager 815 to support data retention handling for data object stores. In some cases, the input module 810 may be a component of an I/O controller 1115 as described with reference to FIG. 11.

The location server communications manager 815 may transmit positioning assistance data (e.g., almanac information) that indicates that a first node operates as a relay (e.g., for a base station, a UE, etc.). In some cases, the location server communications manager 815 may receive a positioning metric that is generated based on the positioning assistance data and a PRS. Accordingly, the location server communications manager 815 may determine a geographic location of a UE based on the positioning metric. The location server communications manager 815 may be an example of aspects of the location server communications manager 1110 described herein.

The location server communications manager 815, or its sub-components, may be implemented in hardware, code (e.g., software or firmware) executed by a processor, or any combination thereof. If implemented in code executed by a processor, the functions of the location server communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The location server communications manager 815, or its sub-components, may be physically located at various positions, including being distributed such that portions of functions are implemented at different physical locations by one or more physical components. In some examples, the location server communications manager 815, or its sub-components, may be a separate and distinct component in accordance with various aspects of the present disclosure. In some examples, the location server communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The output module 820 may manage output signals for the device 805. For example, the output module 820 may receive signals from other components of the device 805, such as the location server communications manager 815, and may transmit these signals to other components or devices. In some specific examples, the output module 820 may transmit output signals for display in a user interface, for storage in a database or data store, for further processing at a server or server cluster, or for any other processes at any number of devices or systems. In some cases, the output module 820 may be a component of an I/O controller 1115 as described with reference to FIG. 11.

Figure 9:
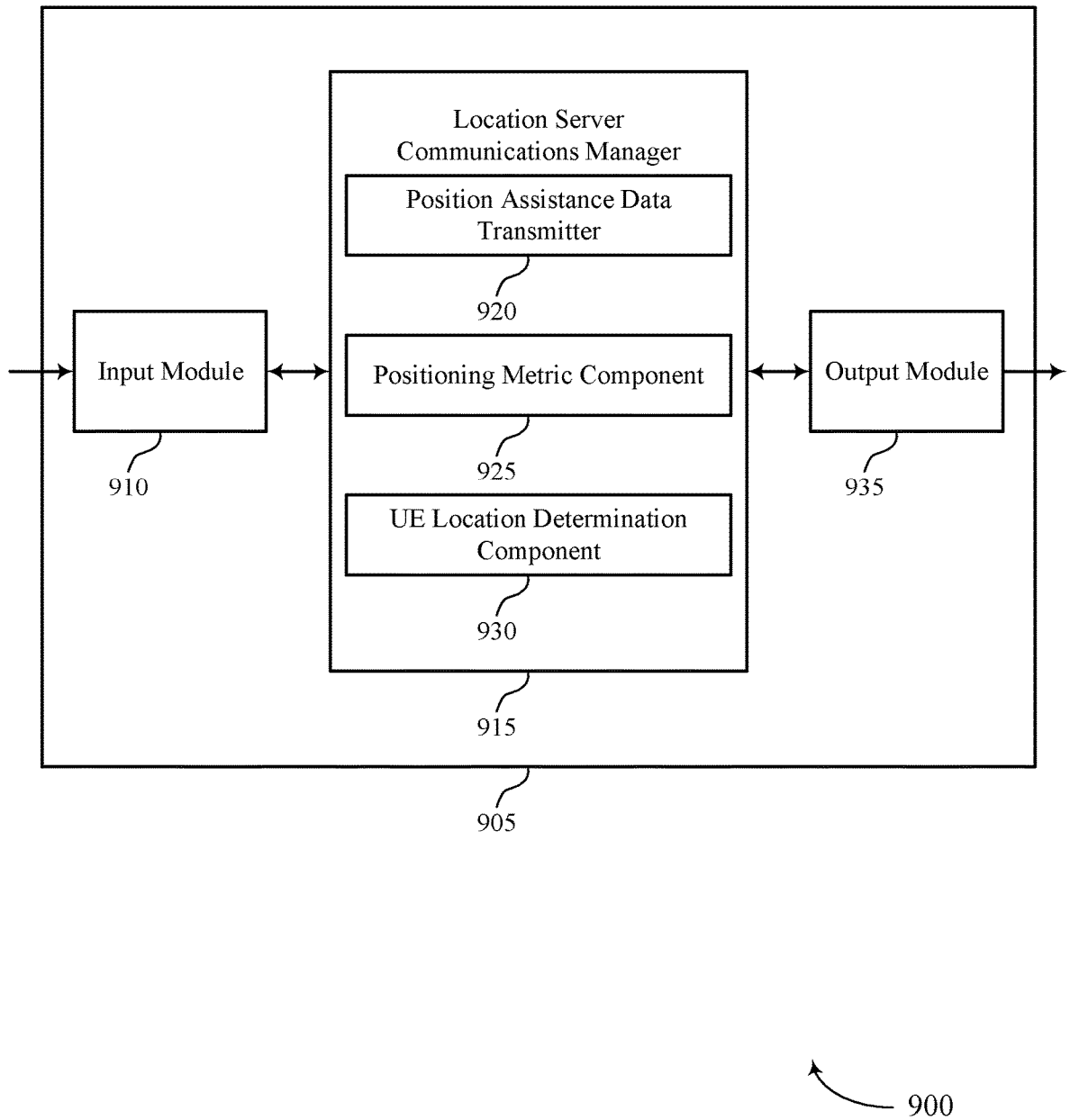

FIG. 9 shows a block diagram 900 of a device 905 that supports positioning with relays in accordance with aspects of the present disclosure. The device 905 may be an example of aspects of a device 805 or a location server as described herein. The device 905 may include an input module 910, a location server communications manager 915, and an output module 935. The device 905 may also include a processor. Each of these components may be in communication with one another (e.g., via one or more buses). In some cases, the device 905 may be an example of a user terminal, a database server, or a system containing multiple computing devices.

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the location server communications manager 915 to support data retention handling for data object stores. In some cases, the input module 910 may be a component of an I/O controller 1115 as described with reference to FIG. 11.

The location server communications manager 915 may be an example of aspects of the location server communications manager 815 as described herein. The location server communications manager 915 may include an positioning assistance data transmitter 920, a positioning metric component 925, and a UE location determination component 930. The location server communications manager 915 may be an example of aspects of the location server communications manager 1005 or 1110 described with reference to FIGS. 10 and 11.

The location server communications manager 915 and/or at least some of its various sub-components may be implemented in hardware, software executed by a processor, firmware, or any combination thereof. If implemented in software executed by a processor, the functions of the location server communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The location server communications manager 915 and/or at least some of its various sub-components may be physically located at various positions, including being distributed such that portions of functions are implemented at different physical locations by one or more physical devices. In some examples, the location server communications manager 915 and/or at least some of its various sub-components may be a separate and distinct component in accordance with various aspects of the present disclosure. In other examples, the location server communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The positioning assistance data transmitter 920 may transmit positioning assistance data (e.g., almanac information) that indicates that a first node operates as a relay (e.g., for a base station, a UE, etc.).

The positioning metric component 925 may receive a positioning metric that is generated based on the positioning assistance data and a PRS.

The UE location determination component 930 may determine a geographic location of a UE based on the positioning metric.

The output module 935 may manage output signals for the device 905. For example, the output module 935 may receive signals from other components of the device 905, such as the location server communications manager 915, and may transmit these signals to other components or devices. In some specific examples, the output module 935 may transmit output signals for display in a user interface, for storage in a database or data store, for further processing at a server or server cluster, or for any other processes at any number of devices or systems. In some cases, the output module 935 may be a component of an I/O controller 1115 as described with reference to FIG. 11.

Figure 10:
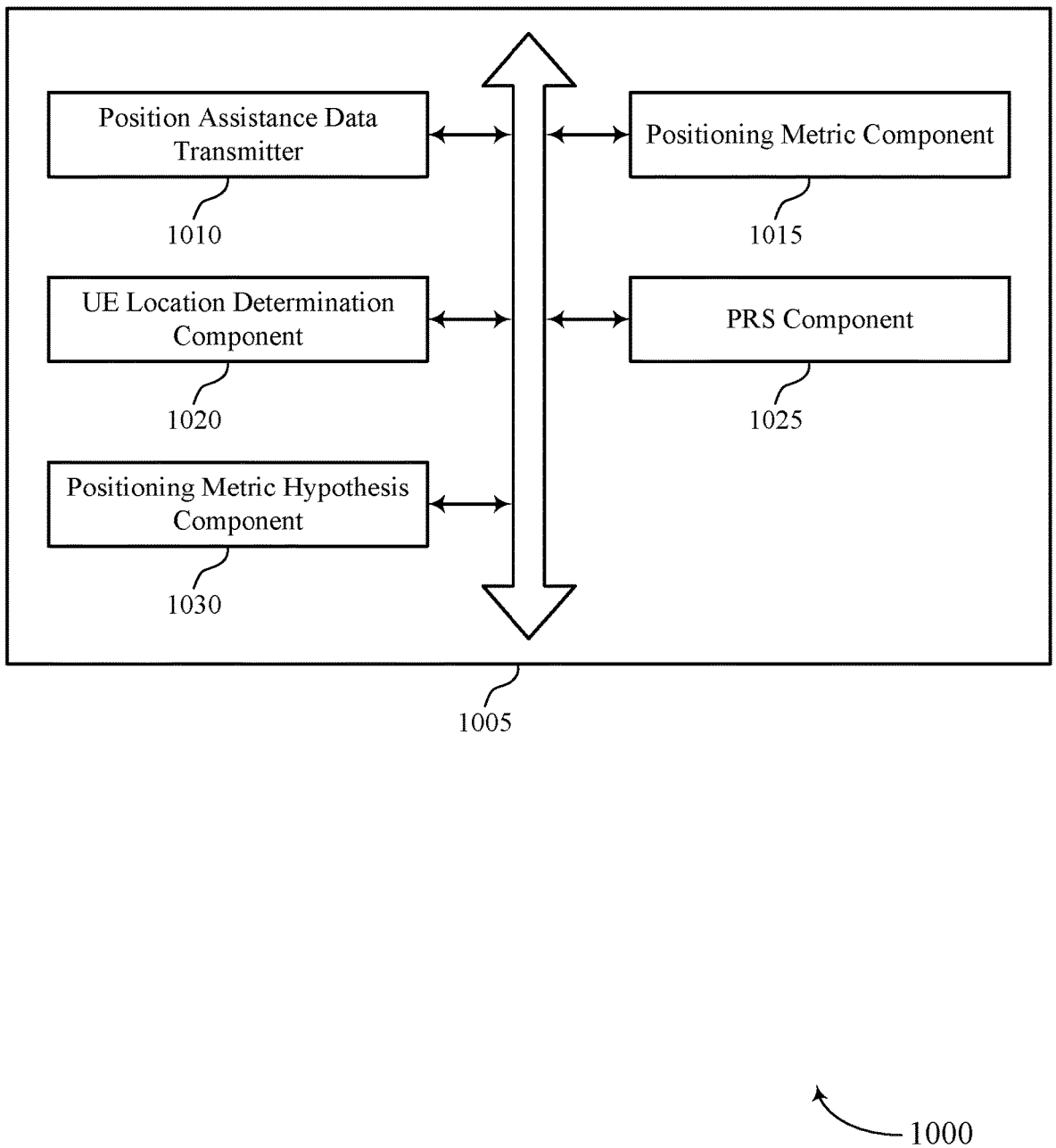
FIG. 10 shows a block diagram of a location server communications manager in accordance with aspects of the present disclosure.

FIG. 10 shows a block diagram 1000 of a location server communications manager 1005 that supports positioning with relays in accordance with aspects of the present disclosure. The location server communications manager 1005 may be an example of aspects of a location server communications manager 815, a location server communications manager 915, or a location server communications manager 1110 described herein. The location server communications manager 1005 may include an positioning assistance data transmitter 1010, a positioning metric component 1015, a UE location determination component 1020, a PRS component 1025, and a positioning metric hypothesis component 1030. Each of these modules may communicate, directly or indirectly, with one another (e.g., via one or more buses).

The positioning assistance data transmitter 1010 may transmit positioning assistance data (e.g., almanac information) that indicates that a first node operates as a relay (e.g., for a base station, a UE, etc.). In some cases, the positioning assistance data may indicate one or more of a cell identifier, a UE identifier, a geographic location, or a beam identifier, for the first node, the second node, or both; one or more of an antenna array configuration, an antenna panel configuration, an orientation, or a beam pattern, for the first node, the second node, or both; a backhaul gain between the first and second nodes, an access gain between the first node and the UE, or both; or a combination thereof. Additionally or alternatively, the positioning assistance data may indicate that the first node is an active relay or a passive relay, that an orientation, attenuation, or both, for at least one angle of incidence for the first node, delay introduced by the first node when relaying a transmission, or a combination thereof. In some cases, the location server may be co-located with the base station.

The positioning metric component 1015 may receive a positioning metric that is generated based on the positioning assistance data and a PRS. In some cases, the positioning metric may include a detected time of arrival, an angle of arrival, or both. In some examples, the positioning metric component 1015 may determine that the PRS is received from the first node based on the positioning assistance data and may generate the positioning metric based on determining that the PRS is received from the first node. Additionally or alternatively, the positioning metric component 1015 may determine that the PRS is received from the base station based on the positioning assistance data and may generate the positioning metric based on determining that the PRS is received from the second node. In some cases, the positioning metric may be a differential measurement. Accordingly, the positioning metric component 1015 may transmit an indication to avoid using a reference signal transmitted by the first node or the base station when generating the differential measurement. In some cases, the indication may be an LPP message, an RRC message, a MAC-CE, or DCI.

The UE location determination component 1020 may determine a geographic location of a UE based on the positioning metric.

The PRS component 1025 may generate the PRS based on a PRS identifier and may transmit the PRS. Additionally or alternatively, the PRS component 1025 may generate the PRS based on a scrambling the PRS using a scrambling code and may transmit the generated PRS.

The positioning metric hypothesis component 1030 may determine a first candidate positioning metric based on a first hypothesis that the PRS is received from the first node, may determine a second candidate positioning metric based on a second hypothesis that the PRS is received from the base station, and may select one of the first candidate positioning metric and the second candidate positioning metric as the positioning metric based on an outlier rejection scheme. Additionally or alternatively, the positioning metric hypothesis component 1030 may determine a first pair of candidate positioning metrics based on a first hypothesis that the PRS is received from the first node, may determine a second pair of candidate positioning metrics based on a second hypothesis that the PRS is received from the base station, and may select one of the first pair of candidate positioning metrics and the second pair of candidate positioning metrics as the positioning metric based on an outlier rejection scheme, where the positioning metric is an RTT positioning metric.

Figure 11:
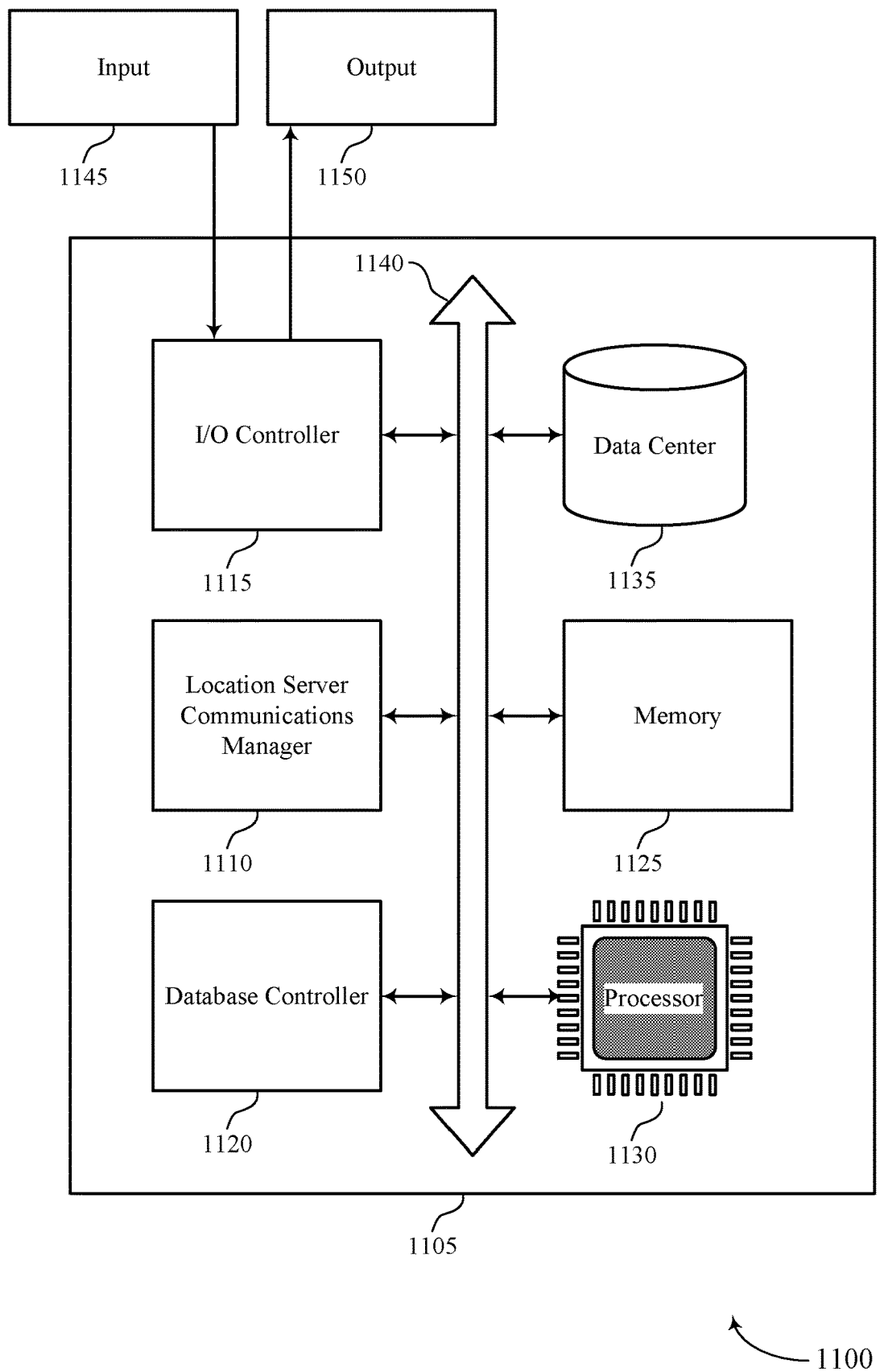
FIG. 11 shows a diagram of a system including a device in accordance with aspects of the present disclosure.

FIG. 11 shows a diagram of a system 1100 including a device 1105 that supports positioning with relays in accordance with aspects of the present disclosure. The device 1105 may be an example of or include the components of a location server or a device 805, device 905, or a location server as described herein. The device 1105 may include components for bi-directional data communications including components for transmitting and receiving communications, including a location server communications manager 1110, an I/O controller 1115, a database controller 1120, memory 1125, a processor 1130, and a database 1135. These components may be in electronic communication via one or more buses (e.g., bus 1140).

The location server communications manager 1110 may be an example of a location server communications manager 915 or 1005 as described herein. For example, the location server communications manager 1110 may perform any of the methods or processes described above with reference to FIGS. 9 and 10. In some cases, the location server communications manager 1110 may be implemented in hardware, software executed by a processor, firmware, or any combination thereof.

The I/O controller 1115 may manage input signals 1145 and output signals 1150 for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The database controller 1120 may manage data storage and processing in a database 1135. In some cases, a user may interact with the database controller 1120. In other cases, the database controller 1120 may operate automatically without user interaction. The database 1135 may be an example of a single database, a distributed database, multiple distributed databases, a data store, a data lake, or an emergency backup database.

Memory 1125 may include RAM and ROM. The memory 1125 may store computer-readable, computer-executable software including instructions that, when executed, cause the processor to perform various functions described herein. In some cases, the memory 1125 may contain, among other things, a BIOS which may control basic hardware or software operation such as the interaction with peripheral components or devices.

The processor 1130 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting positioning with relays).

Figure 12:
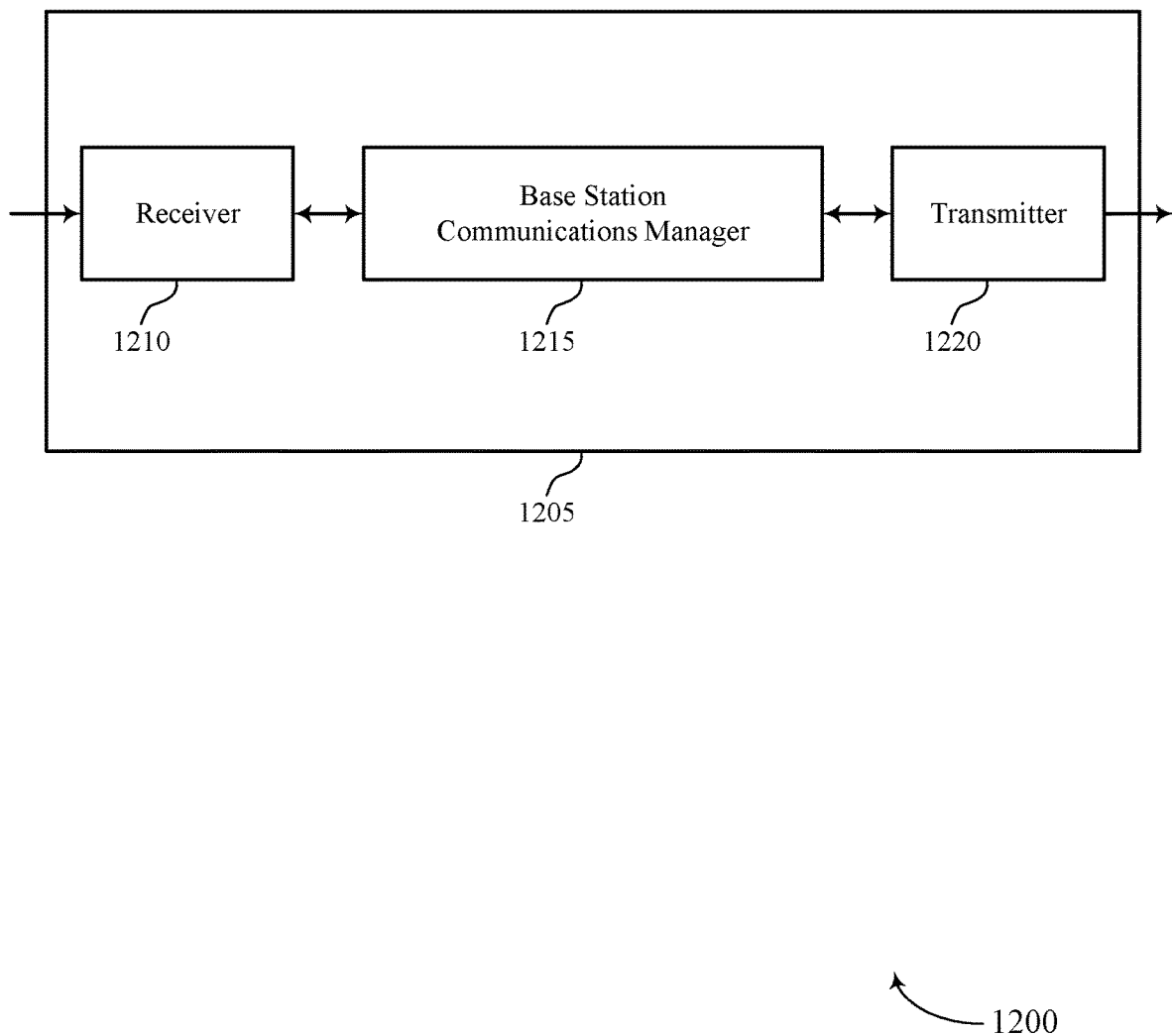
FIGS. 12 and 13 show block diagrams of devices in accordance with aspects of the present disclosure.

FIG. 12 shows a block diagram 1200 of a device 1205 that supports positioning with relays in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to positioning with relays, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may receive a positioning metric from a UE that is generated based on a PRS and positioning assistance data (e.g., almanac information) that indicates that a first node operates as a relay for the base station. Additionally, the base station communications manager 1215 may transmit the positioning metric to a location server. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
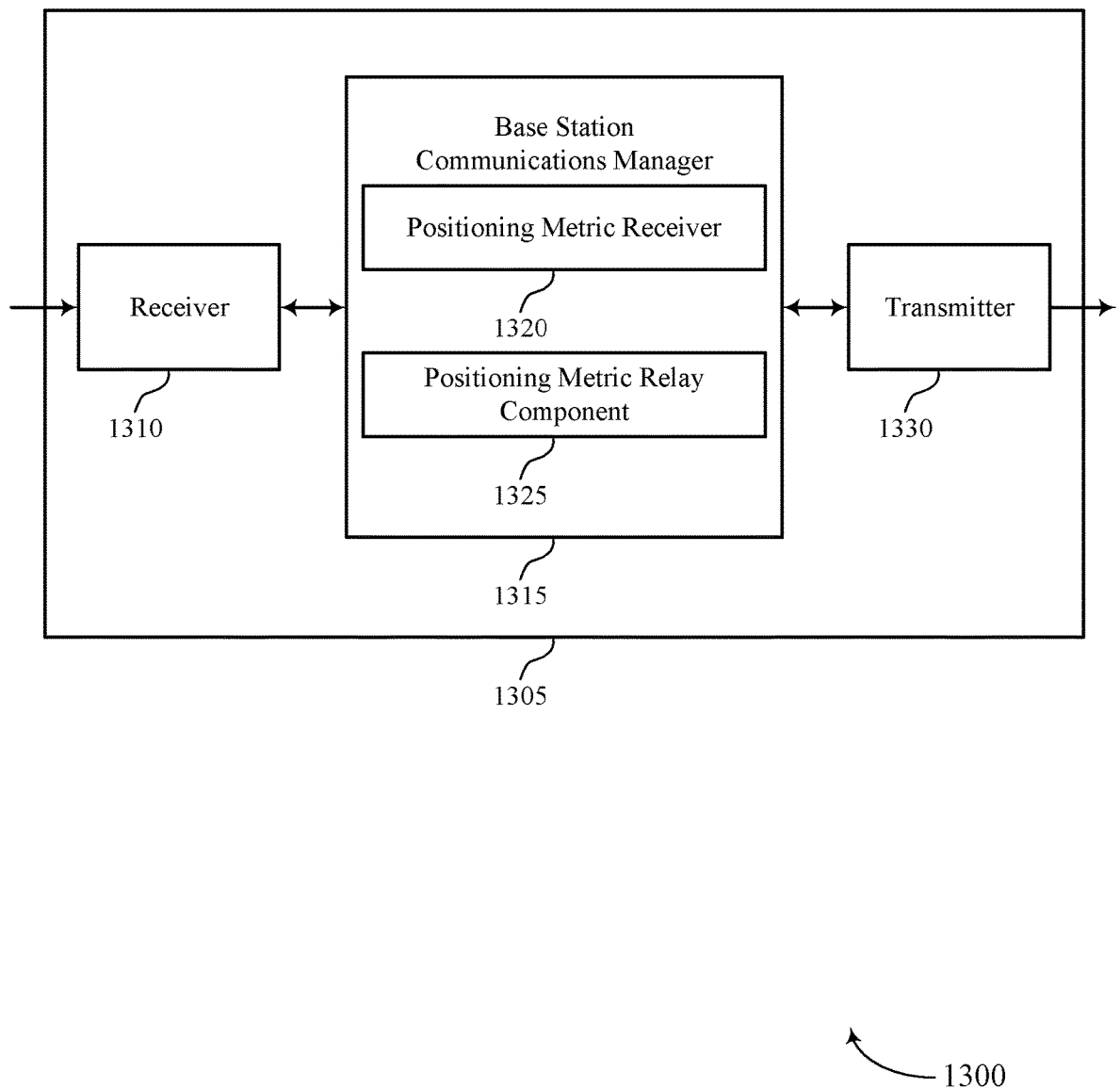

FIG. 13 shows a block diagram 1300 of a device 1305 that supports positioning with relays in accordance with aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to positioning with relays, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a positioning metric receiver 1320 and a positioning metric relay component 1325. The base station communications manager 1315 may be an example of aspects of the base station communications manager 1510 described herein.

The positioning metric receiver 1320 may receive a positioning metric from a UE that is generated based on a PRS and positioning assistance data (e.g., almanac information) that indicates that a first node operates as a relay for the base station.

The positioning metric relay component 1325 may transmit the positioning metric to a location server.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
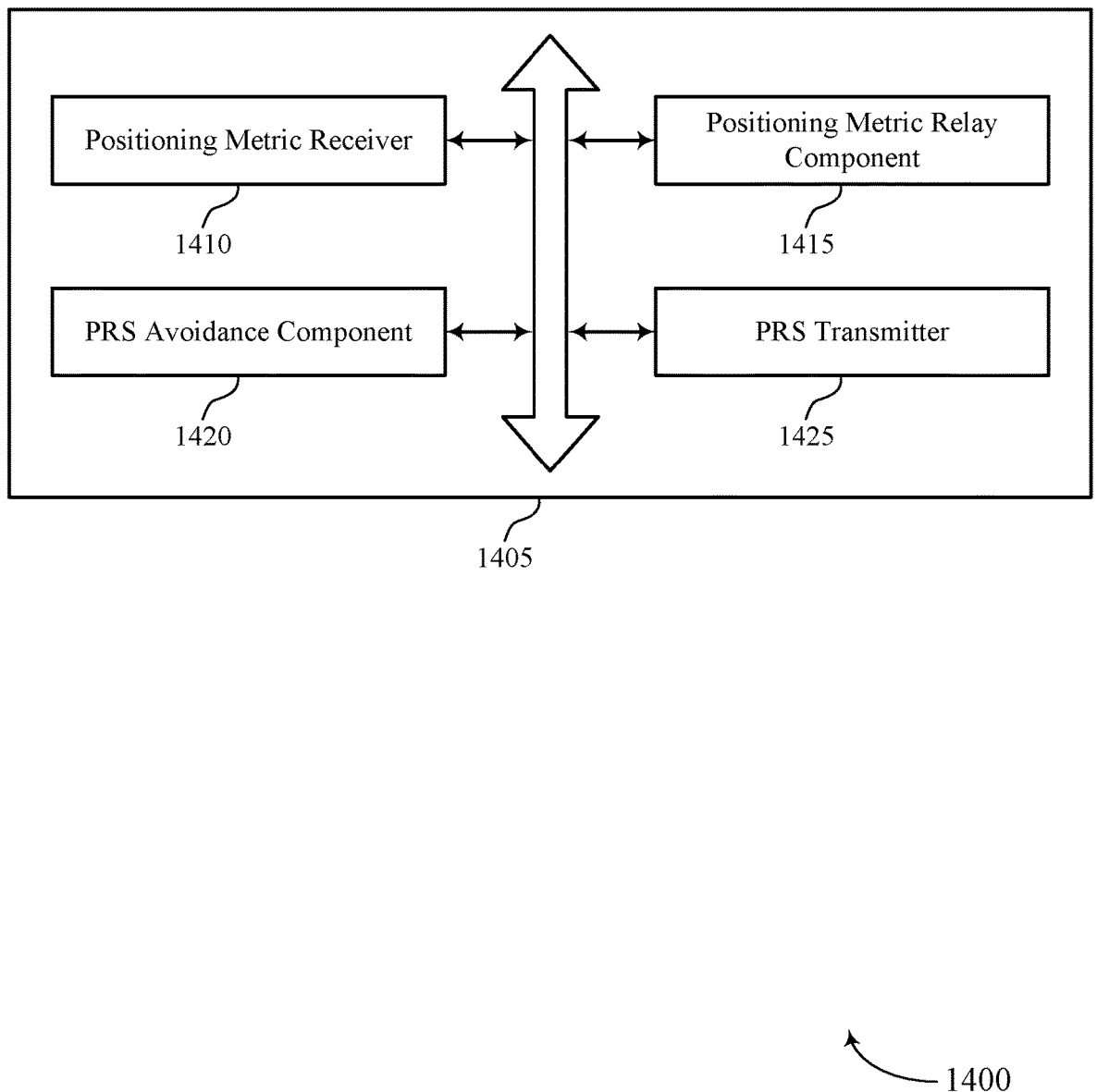
FIG. 14 shows a block diagram of a base station communications manager in accordance with aspects of the present disclosure.

FIG. 14 shows a block diagram 1400 of a base station communications manager 1405 that supports positioning with relays in accordance with aspects of the present disclosure. The base station communications manager 1405 may be an example of aspects of a base station communications manager 1215, a base station communications manager 1315, or a base station communications manager 1510 described herein. The base station communications manager 1405 may include a positioning metric receiver 1410, a positioning metric relay component 1415, a PRS avoidance component 1420, and a PRS transmitter 1425. Each of these modules may communicate, directly or indirectly, with one another (e.g., via one or more buses).

The positioning metric receiver 1410 may receive a positioning metric from a UE that is generated based on a PRS and positioning assistance data (e.g., almanac information) that indicates that a first node operates as a relay for the base station. In some cases, the base station may be co-located with the location server.

The positioning metric relay component 1415 may transmit the positioning metric to a location server.

The PRS avoidance component 1420 may transmit an indication to avoid using a second PRS transmitted by the first node or the base station when generating the positioning metric that includes a differential measurement. In some cases, the indication may be an LPP message, an RRC message, a MAC-CE, or DCI.

The PRS transmitter 1425 may transmit the PRS.

Figure 15:
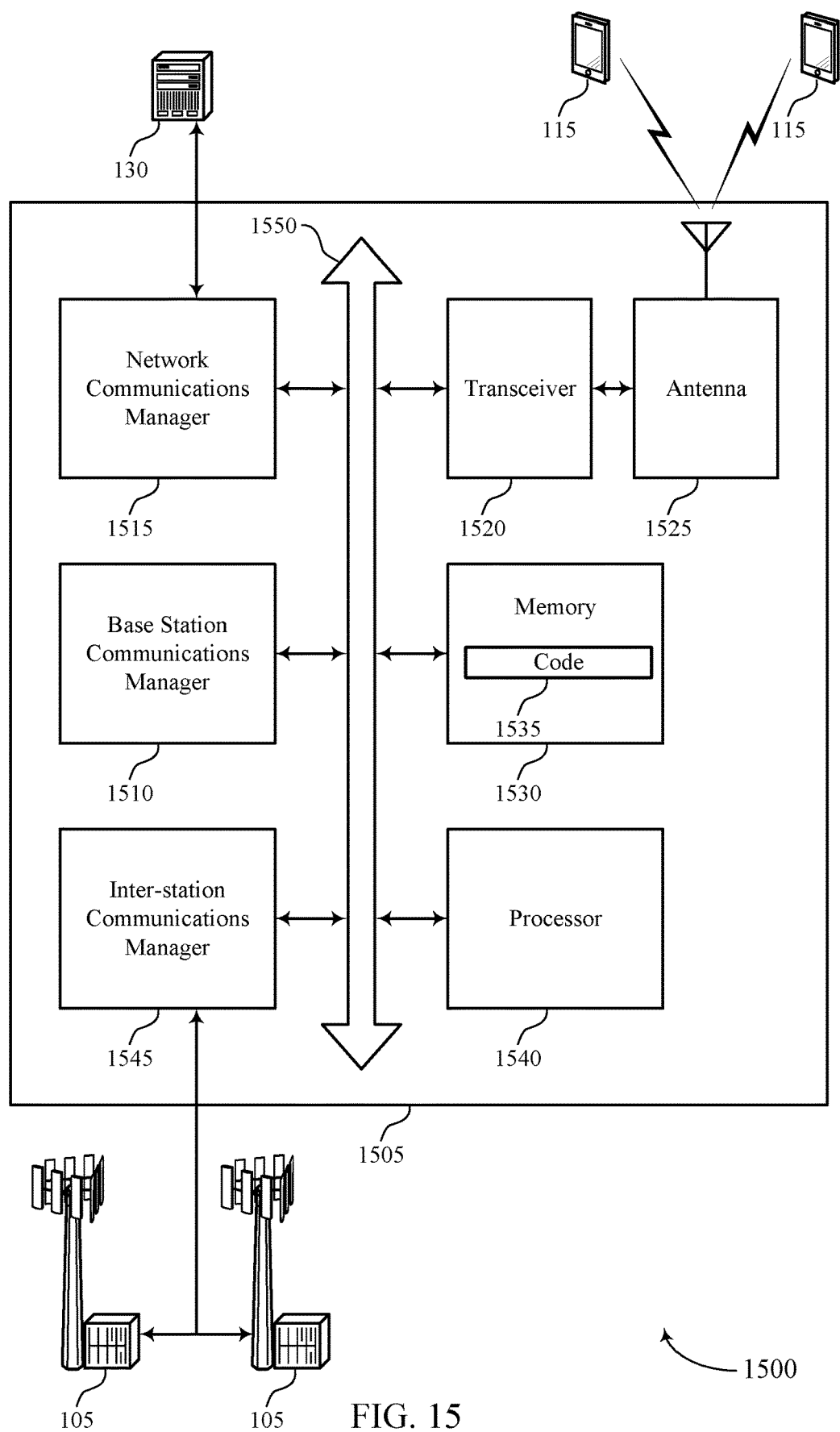
FIG. 15 shows a diagram of a system including a device in accordance with aspects of the present disclosure.

FIG. 15 shows a diagram of a system 1500 including a device 1505 that supports positioning with relays in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may receive a positioning metric from a UE that is generated based on a PRS and positioning assistance data (e.g., almanac information) that indicates that a first node operates as a relay for the base station. Additionally, the base station communications manager 1510 may transmit the positioning metric to a location server.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting positioning with relays).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
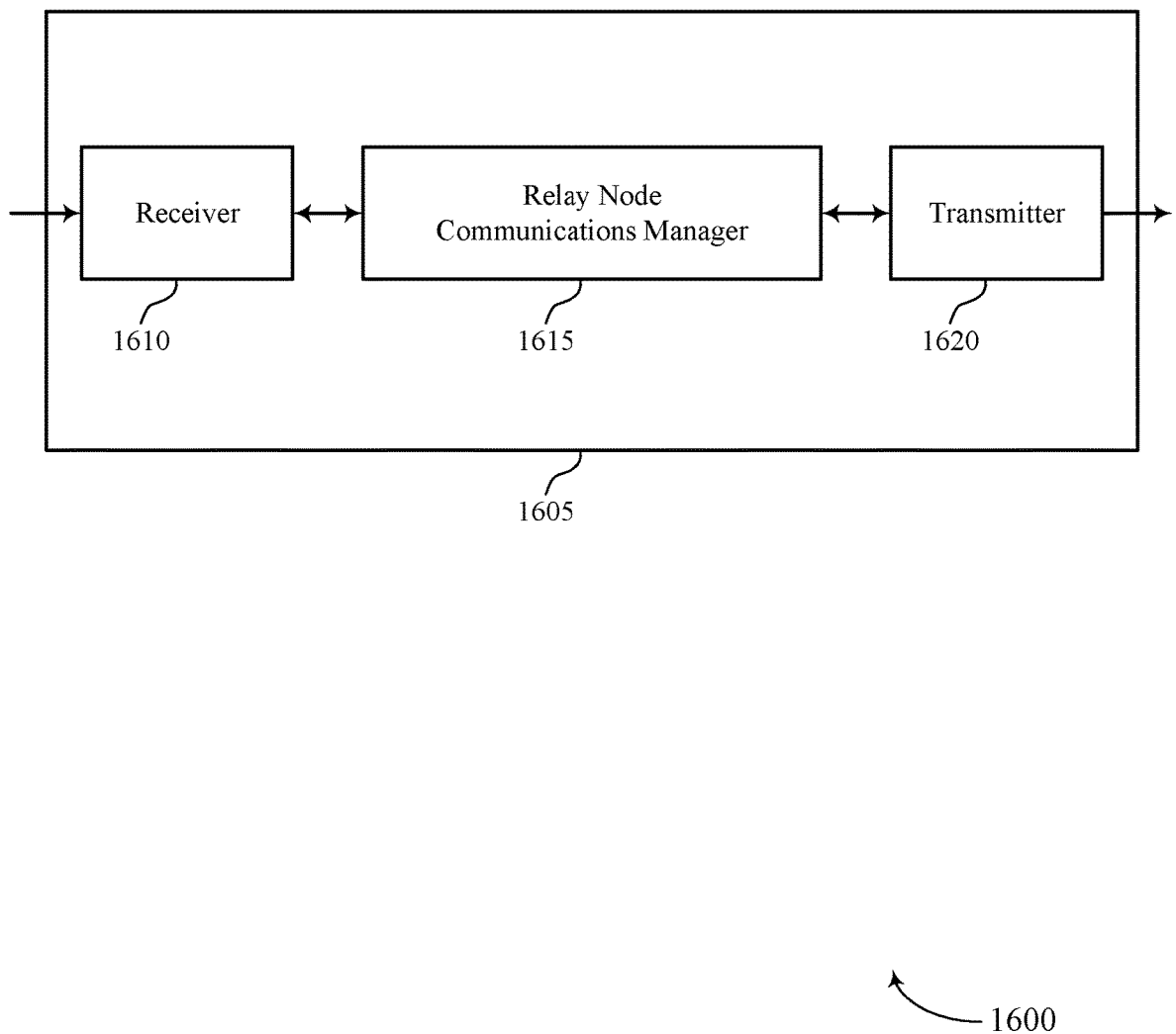
FIGS. 16 and 17 show block diagrams of devices in accordance with aspects of the present disclosure.

FIG. 16 shows a block diagram 1600 of a device 1605 that supports positioning with relays in accordance with aspects of the present disclosure. The device 1605 may be an example of aspects of a relay or relay node as described herein. The device 1605 may include a receiver 1610, a relay node communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to positioning with relays, etc.). Information may be passed on to other components of the device 1605. The receiver 1610 may be an example of aspects of the transceiver 1920 described with reference to FIG. 19. The receiver 1610 may utilize a single antenna or a set of antennas.

The relay node communications manager 1615 may receive a TTI format indication that indicates that a TTI is either a downlink TTI or an uplink TTI. Additionally, the relay node communications manager 1615 may receive a transmission for relaying within the TTI. Accordingly, the relay node communications manager 1615 may relay the transmission during the TTI in accordance with the TTI format indication. The relay node communications manager 1615 may be an example of aspects of the relay node communications manager 1910 described herein.

The relay node communications manager 1615, or its sub-components, may be implemented in hardware, code (e.g., software or firmware) executed by a processor, or any combination thereof. If implemented in code executed by a processor, the functions of the relay node communications manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The relay node communications manager 1615, or its sub-components, may be physically located at various positions, including being distributed such that portions of functions are implemented at different physical locations by one or more physical components. In some examples, the relay node communications manager 1615, or its sub-components, may be a separate and distinct component in accordance with various aspects of the present disclosure. In some examples, the relay node communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
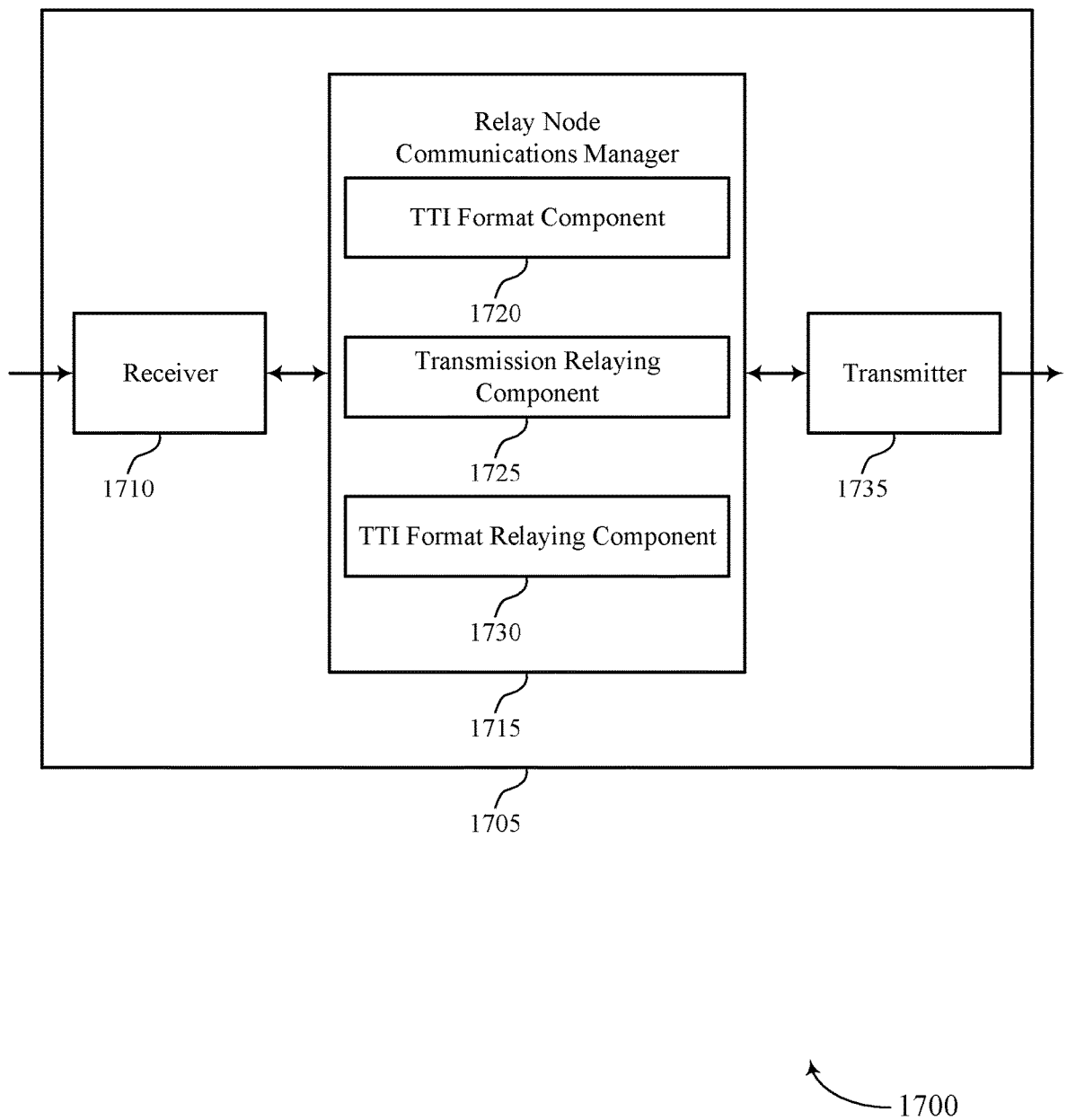

FIG. 17 shows a block diagram 1700 of a device 1705 that supports positioning with relays in accordance with aspects of the present disclosure. The device 1705 may be an example of aspects of a device 1605 or a relay node as described herein. The device 1705 may include a receiver 1710, a relay node communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to positioning with relays, etc.). Information may be passed on to other components of the device 1705. The receiver 1710 may be an example of aspects of the transceiver 1920 described with reference to FIG. 19. The receiver 1710 may utilize a single antenna or a set of antennas.

The relay node communications manager 1715 may be an example of aspects of the relay node communications manager 1615 as described herein. The relay node communications manager 1715 may include a TTI format component 1720, a transmission relaying component 1725, and a TTI format relaying component 1730. The relay node communications manager 1715 may be an example of aspects of the relay node communications manager 1910 described herein.

The TTI format component 1720 may receive a TTI format indication that indicates that a TTI is either a downlink TTI or an uplink TTI.

The transmission relaying component 1725 may receive a transmission for relaying within the TTI.

The TTI format relaying component 1730 may relay the transmission during the TTI in accordance with the TTI format indication.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
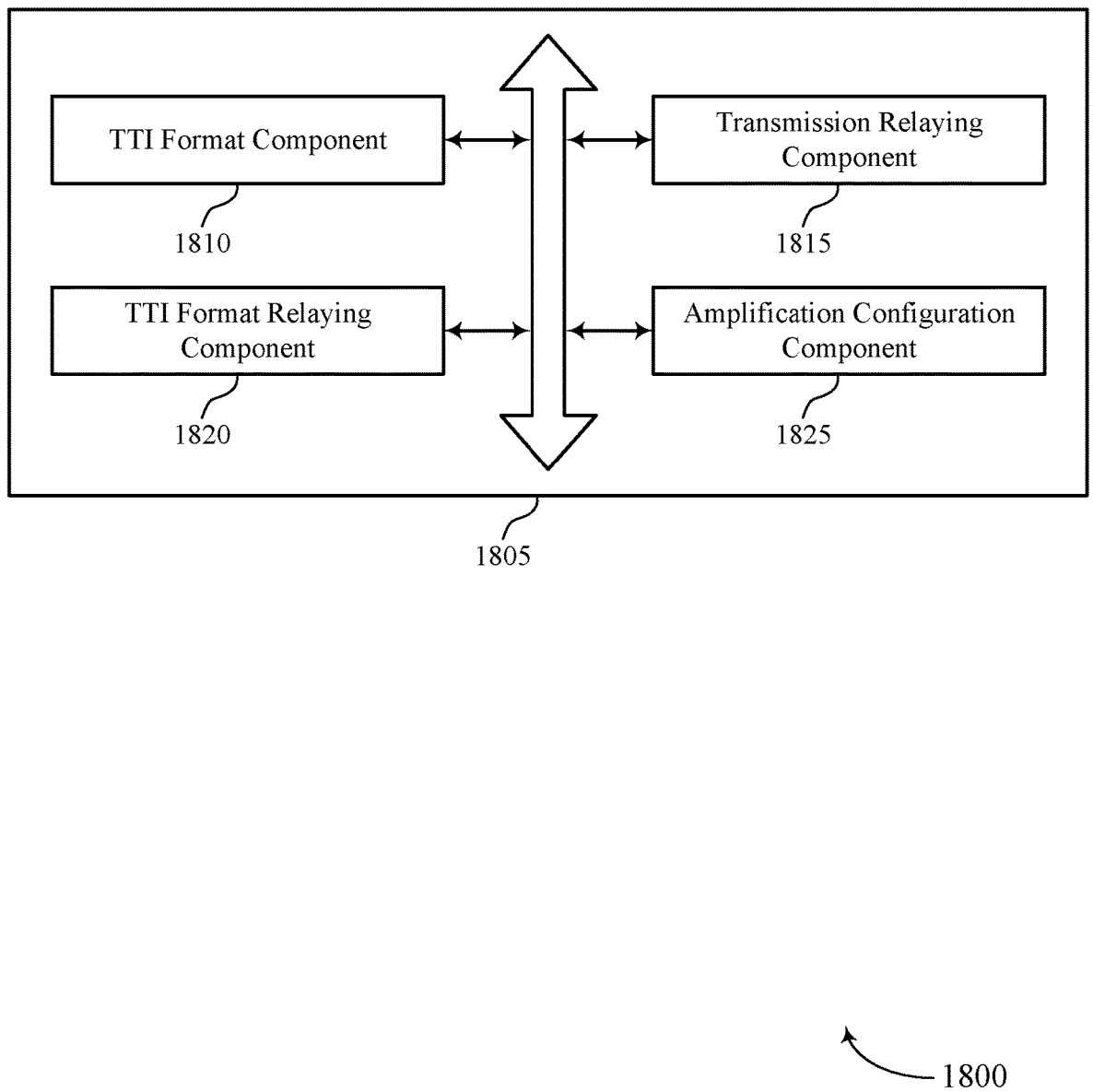
FIG. 18 shows a block diagram of a relay node communications manager in accordance with aspects of the present disclosure.

FIG. 18 shows a block diagram 1800 of a relay node communications manager 1805 that supports positioning with relays in accordance with aspects of the present disclosure. The relay node communications manager 1805 may be an example of aspects of a relay node communications manager 1615, a relay node communications manager 1715, or a relay node communications manager 1910 described herein. The relay node communications manager 1805 may include a TTI format component 1810, a transmission relaying component 1815, a TTI format relaying component 1820, and an amplification configuration component 1825. Each of these modules may communicate, directly or indirectly, with one another (e.g., via one or more buses).

The TTI format component 1810 may receive a TTI format indication that indicates that a TTI is either a downlink TTI or an uplink TTI.

The transmission relaying component 1815 may receive a transmission for relaying within the TTI.

The TTI format relaying component 1820 may relay the transmission during the TTI in accordance with the TTI format indication.

The amplification configuration component 1825 may receive a configuration that indicates an uplink amplification level for relaying an uplink transmission from a UE to a base station and a downlink amplification level for relaying a downlink transmission from the base station to the UE, where the transmission is relayed in accordance with the configuration. In some examples, the amplification configuration component 1825 may relay an uplink transmission to the base station in accordance with the uplink amplification level. Additionally or alternatively, the amplification configuration component 1825 may relay a downlink transmission to the UE in accordance with the downlink amplification level.

In some examples, the amplification configuration component 1825 may process the configuration to determine a reference signal configuration, where the transmission is relayed in accordance with the reference signal configuration. Additionally or alternatively, the amplification configuration component 1825 may process the configuration to determine a subset of channels of a set of channels to relay, where the transmission is received within a first channel of the subset of channels. In some examples, the amplification configuration component 1825 may process the configuration to determine an uplink power control configuration, where the transmission is transmitted in accordance with the uplink power control configuration. In some cases, the reference signal configuration may be a CSI-RS configuration, an SSB configuration, an SRS configuration, a PRS configuration, or any combination thereof.

Figure 19:
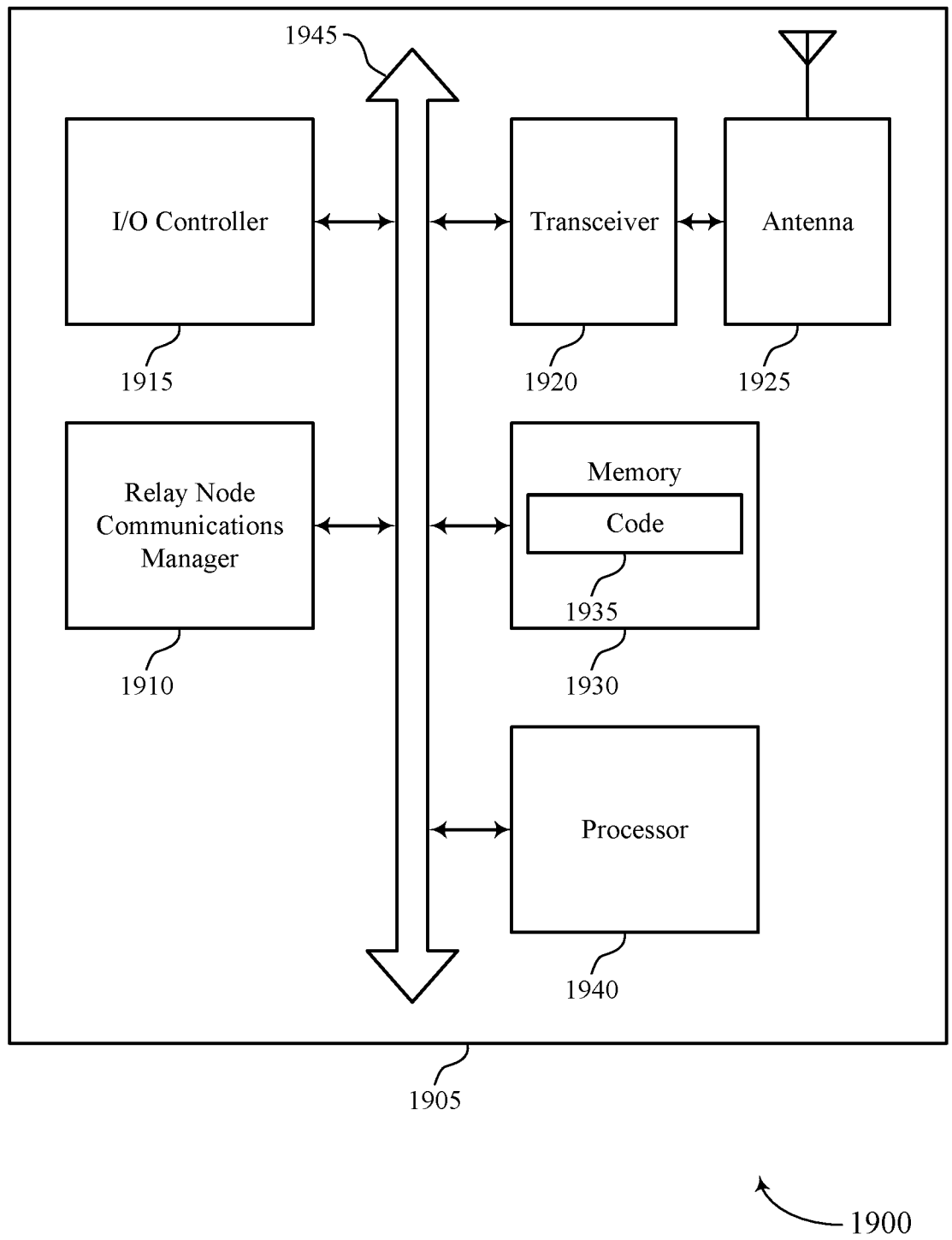
FIG. 19 shows a diagram of a system including a device in accordance with aspects of the present disclosure.

FIG. 19 shows a diagram of a system 1900 including a device 1905 that supports positioning with relays in accordance with aspects of the present disclosure. The device 1905 may be an example of or include the components of device 1605, device 1705, or a relay node as described herein. The device 1905 may include components for bi-directional voice and data communications including components for transmitting and receiving communications, including a relay node communications manager 1910, an I/O controller 1915, a transceiver 1920, an antenna 1925, memory 1930, and a processor 1940. These components may be in electronic communication via one or more buses (e.g., bus 1945).

The relay node communications manager 1910 may receive a TTI format indication that indicates that a TTI is either a downlink TTI or an uplink TTI. Additionally, the relay node communications manager 1910 may receive a transmission for relaying within the TTI. Accordingly, the relay node communications manager 1910 may relay the transmission during the TTI in accordance with the TTI format indication.

The I/O controller 1915 may manage input and output signals for the device 1905. The I/O controller 1915 may also manage peripherals not integrated into the device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1935 including instructions that, when executed, cause the processor to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting positioning with relays).

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
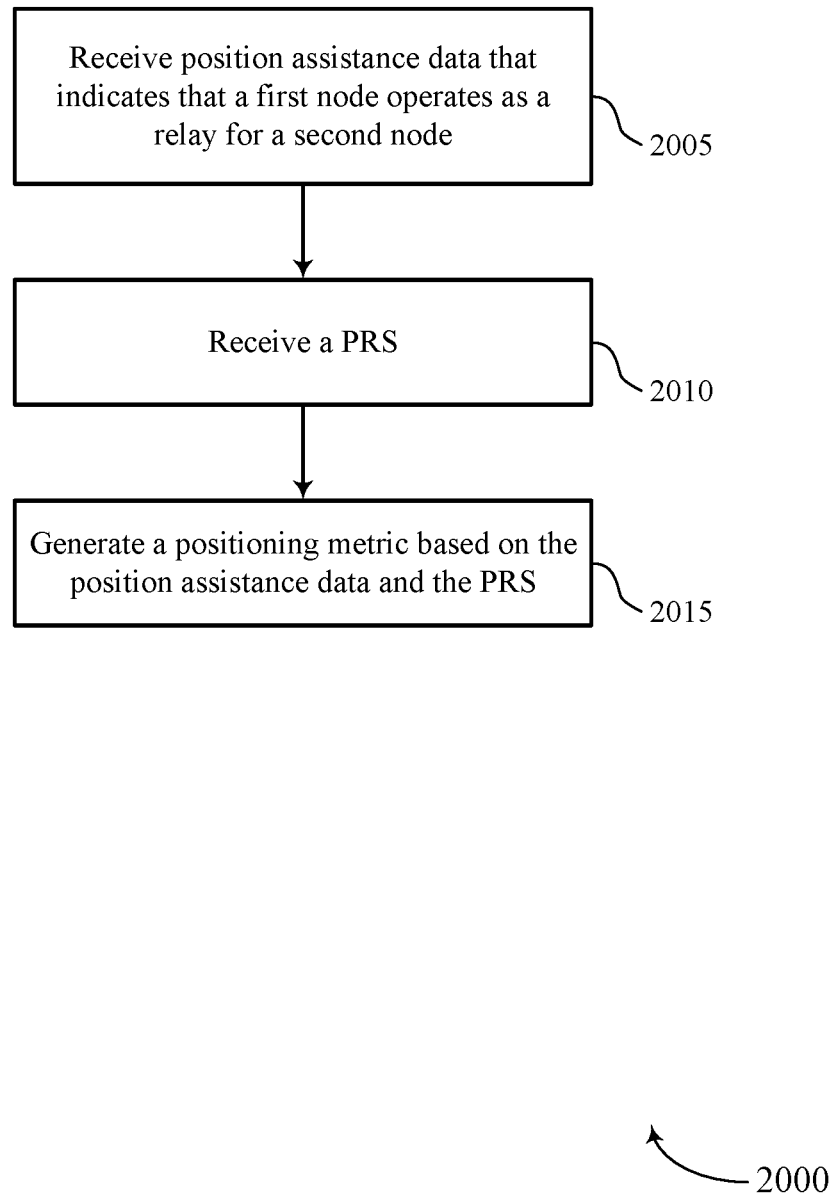
FIGS. 20 through 26 show flowcharts illustrating methods in accordance with aspects of the present disclosure.

FIG. 20 shows a flowchart illustrating a method 2000 that supports positioning with relays in accordance with aspects of the present disclosure. The operations of method 2000 may be implemented by a UE 115 or its components as described herein. For example, the operations of method 2000 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2005, the UE may receive positioning assistance data that indicates that a first node operates as a relay for a second node (e.g., that operates as a base station). The operations of 2005 may be performed according to the methods described herein. In some examples, aspects of the operations of 2005 may be performed by an positioning assistance data receiver as described with reference to FIGS. 4 through 7.

At 2010, the UE may receive a PRS. The operations of 2010 may be performed according to the methods described herein. In some examples, aspects of the operations of 2010 may be performed by a PRS receiver as described with reference to FIGS. 4 through 7.

At 2015, the UE may generate a positioning metric based on the positioning assistance data and the PRS. The operations of 2015 may be performed according to the methods described herein. In some examples, aspects of the operations of 2015 may be performed by a positioning metric generator as described with reference to FIGS. 4 through 7.

Figure 21:
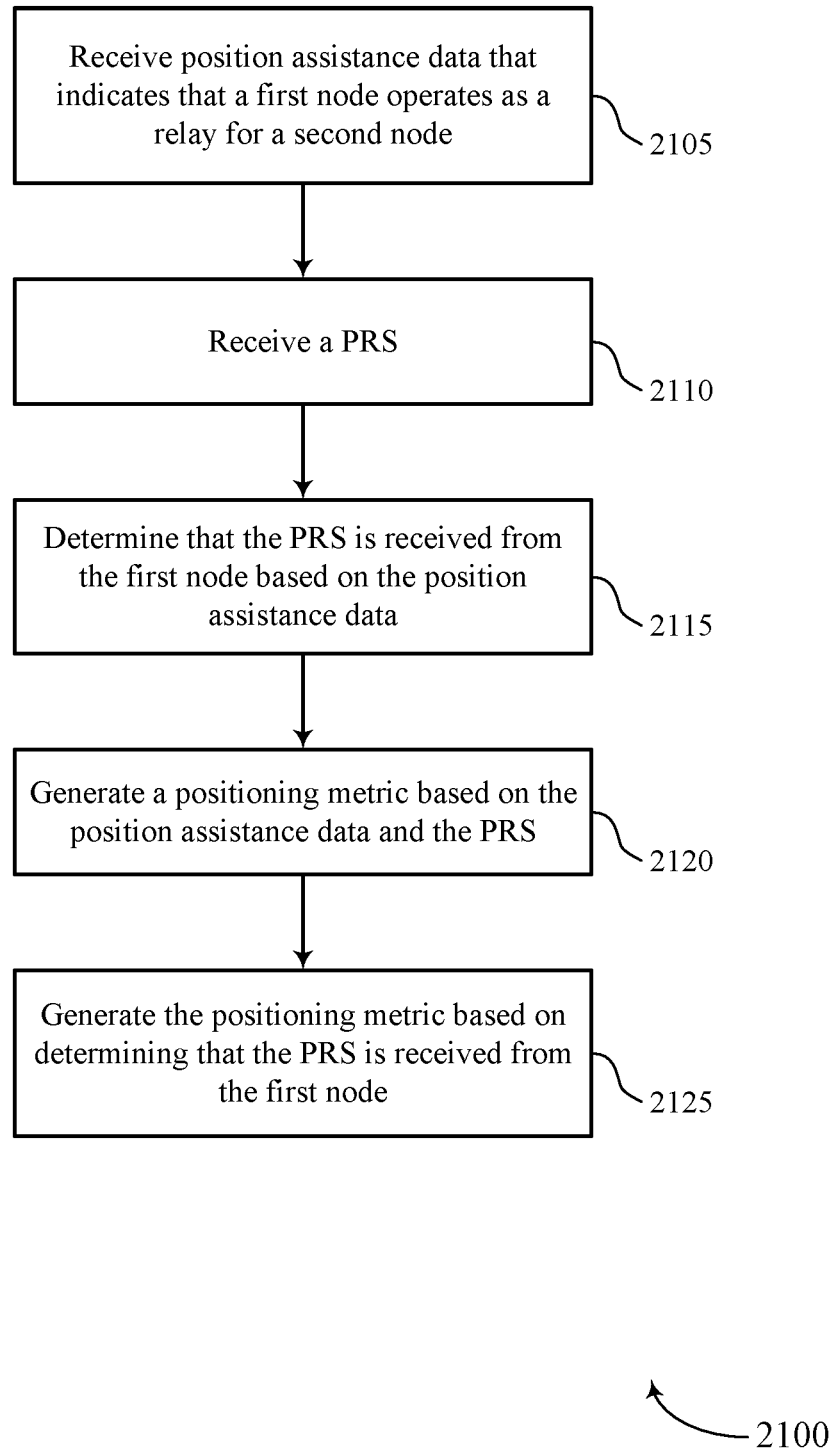

FIG. 21 shows a flowchart illustrating a method 2100 that supports positioning with relays in accordance with aspects of the present disclosure. The operations of method 2100 may be implemented by a UE 115 or its components as described herein. For example, the operations of method 2100 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2105, the UE may receive positioning assistance data that indicates that a first node operates as a relay for a second node (e.g., that operates as a base station). The operations of 2105 may be performed according to the methods described herein. In some examples, aspects of the operations of 2105 may be performed by an positioning assistance data receiver as described with reference to FIGS. 4 through 7.

At 2110, the UE may receive a PRS. The operations of 2110 may be performed according to the methods described herein. In some examples, aspects of the operations of 2110 may be performed by a PRS receiver as described with reference to FIGS. 4 through 7.

At 2115, the UE may determine that the PRS is received from the first node based on the positioning assistance data. The operations of 2115 may be performed according to the methods described herein. In some examples, aspects of the operations of 2115 may be performed by a positioning metric generator as described with reference to FIGS. 4 through 7.

At 2120, the UE may generate a positioning metric based on the positioning assistance data and the PRS. The operations of 2120 may be performed according to the methods described herein. In some examples, aspects of the operations of 2120 may be performed by a positioning metric generator as described with reference to FIGS. 4 through 7.

At 2125, the UE may generate the positioning metric based on determining that the PRS is received from the first node. The operations of 2125 may be performed according to the methods described herein. In some examples, aspects of the operations of 2125 may be performed by a positioning metric generator as described with reference to FIGS. 4 through 7.

Figure 22:
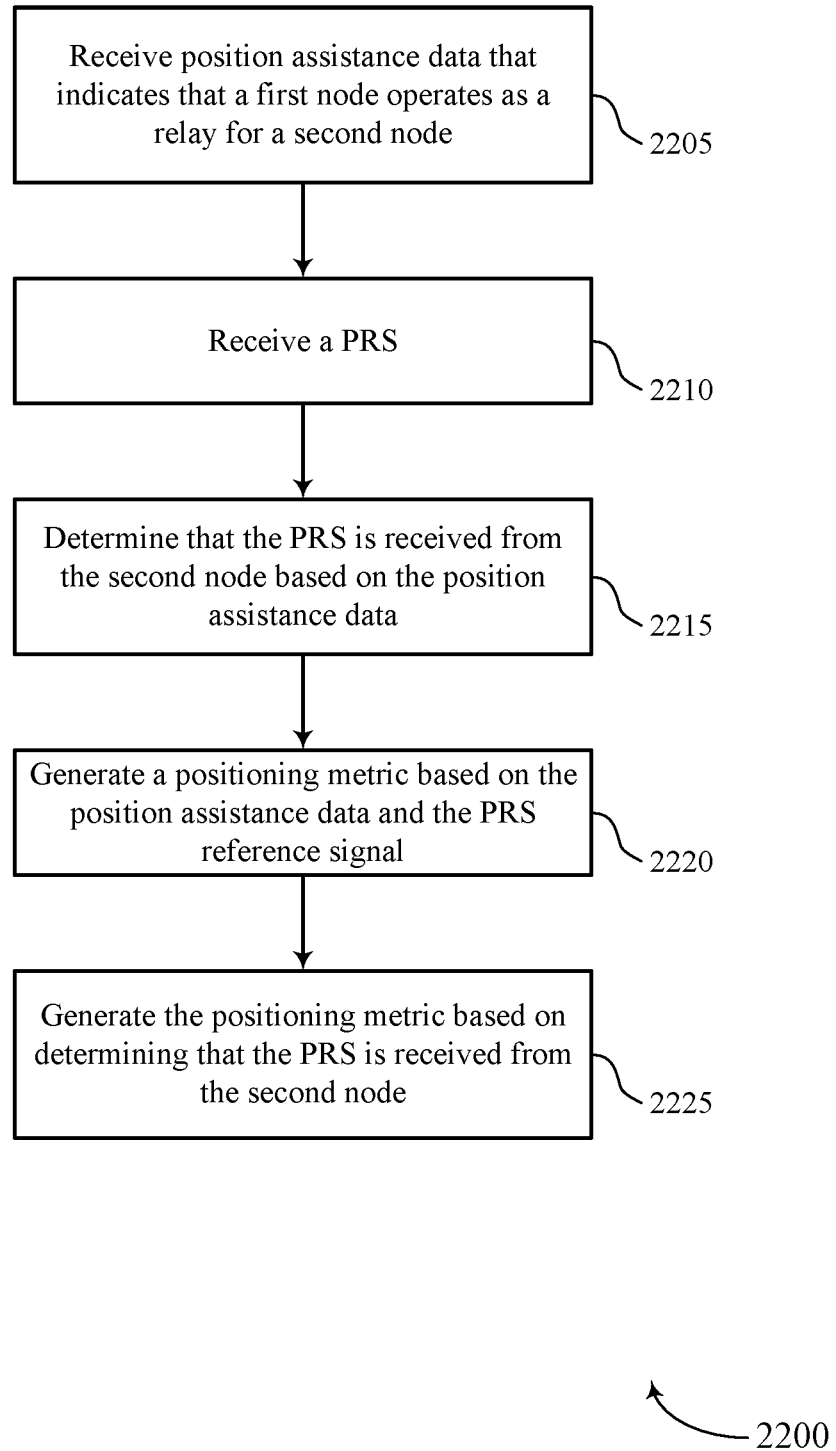

FIG. 22 shows a flowchart illustrating a method 2200 that supports positioning with relays in accordance with aspects of the present disclosure. The operations of method 2200 may be implemented by a UE 115 or its components as described herein. For example, the operations of method 2200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2205, the UE may receive positioning assistance data that indicates that a first node operates as a relay for a second node (e.g., that operates as a base station). The operations of 2205 may be performed according to the methods described herein. In some examples, aspects of the operations of 2205 may be performed by an positioning assistance data receiver as described with reference to FIGS. 4 through 7.

At 2210, the UE may receive a PRS. The operations of 2210 may be performed according to the methods described herein. In some examples, aspects of the operations of 2210 may be performed by a PRS receiver as described with reference to FIGS. 4 through 7.

At 2215, the UE may determine that the PRS is received from the second node based on the positioning assistance data. The operations of 2215 may be performed according to the methods described herein. In some examples, aspects of the operations of 2215 may be performed by a positioning metric generator as described with reference to FIGS. 4 through 7.

At 2220, the UE may generate a positioning metric based on the positioning assistance data and the PRS. The operations of 2220 may be performed according to the methods described herein. In some examples, aspects of the operations of 2220 may be performed by a positioning metric generator as described with reference to FIGS. 4 through 7.

At 2225, the UE may generate the positioning metric based on determining that the PRS is received from the second node. The operations of 2225 may be performed according to the methods described herein. In some examples, aspects of the operations of 2225 may be performed by a positioning metric generator as described with reference to FIGS. 4 through 7.

Figure 23:
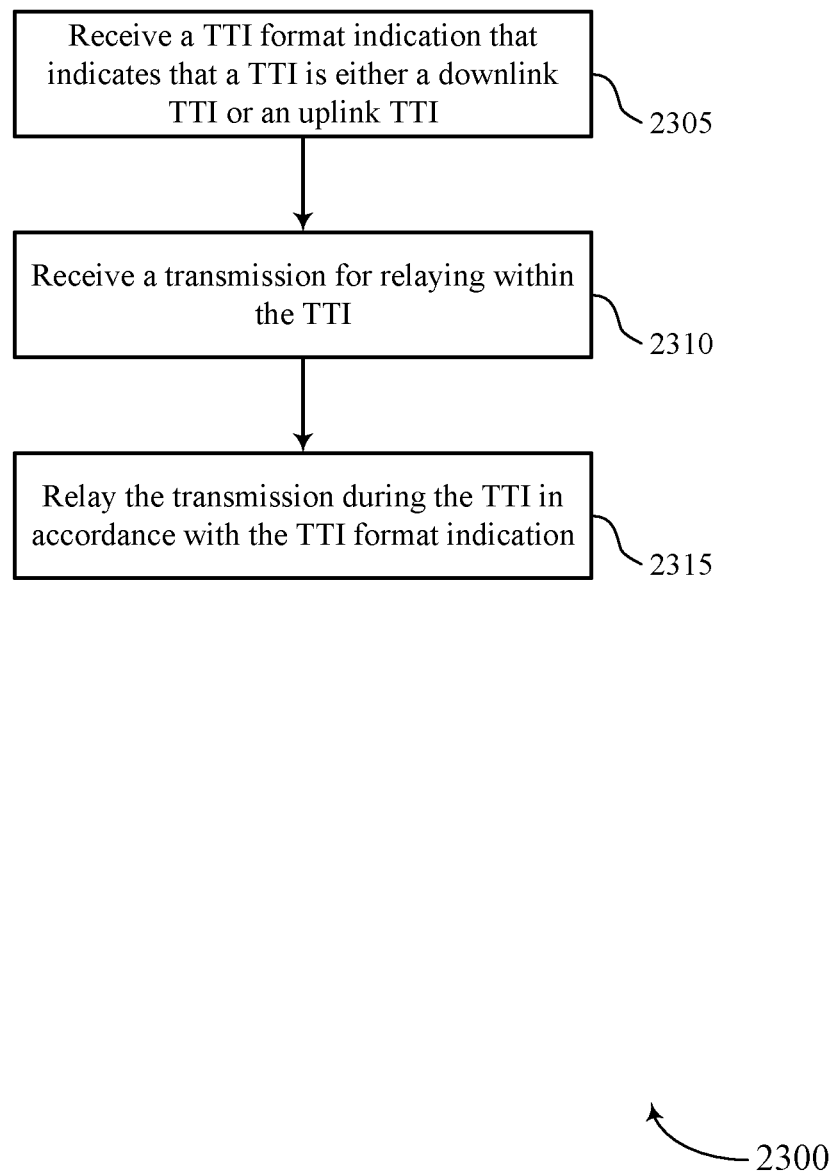

FIG. 23 shows a flowchart illustrating a method 2300 that supports positioning with relays in accordance with aspects of the present disclosure. The operations of method 2300 may be implemented by a relay node or its components as described herein. For example, the operations of method 2300 may be performed by a relay node communications manager as described with reference to FIGS. 16 through 19. In some examples, a relay node may execute a set of instructions to control the functional elements of the relay node to perform the functions described below. Additionally or alternatively, a relay node may perform aspects of the functions described below using special-purpose hardware.

At 2305, the relay node may receive a TTI format indication that indicates that a TTI is either a downlink TTI or an uplink TTI. The operations of 2305 may be performed according to the methods described herein. In some examples, aspects of the operations of 2305 may be performed by a TTI format component as described with reference to FIGS. 16 through 19.

At 2310, the relay node may receive a transmission for relaying within the TTI. The operations of 2310 may be performed according to the methods described herein. In some examples, aspects of the operations of 2310 may be performed by a transmission relaying component as described with reference to FIGS. 16 through 19.

At 2315, the relay node may relay the transmission during the TTI in accordance with the TTI format indication. The operations of 2315 may be performed according to the methods described herein. In some examples, aspects of the operations of 2315 may be performed by a TTI format relaying component as described with reference to FIGS. 16 through 19.

Figure 24:
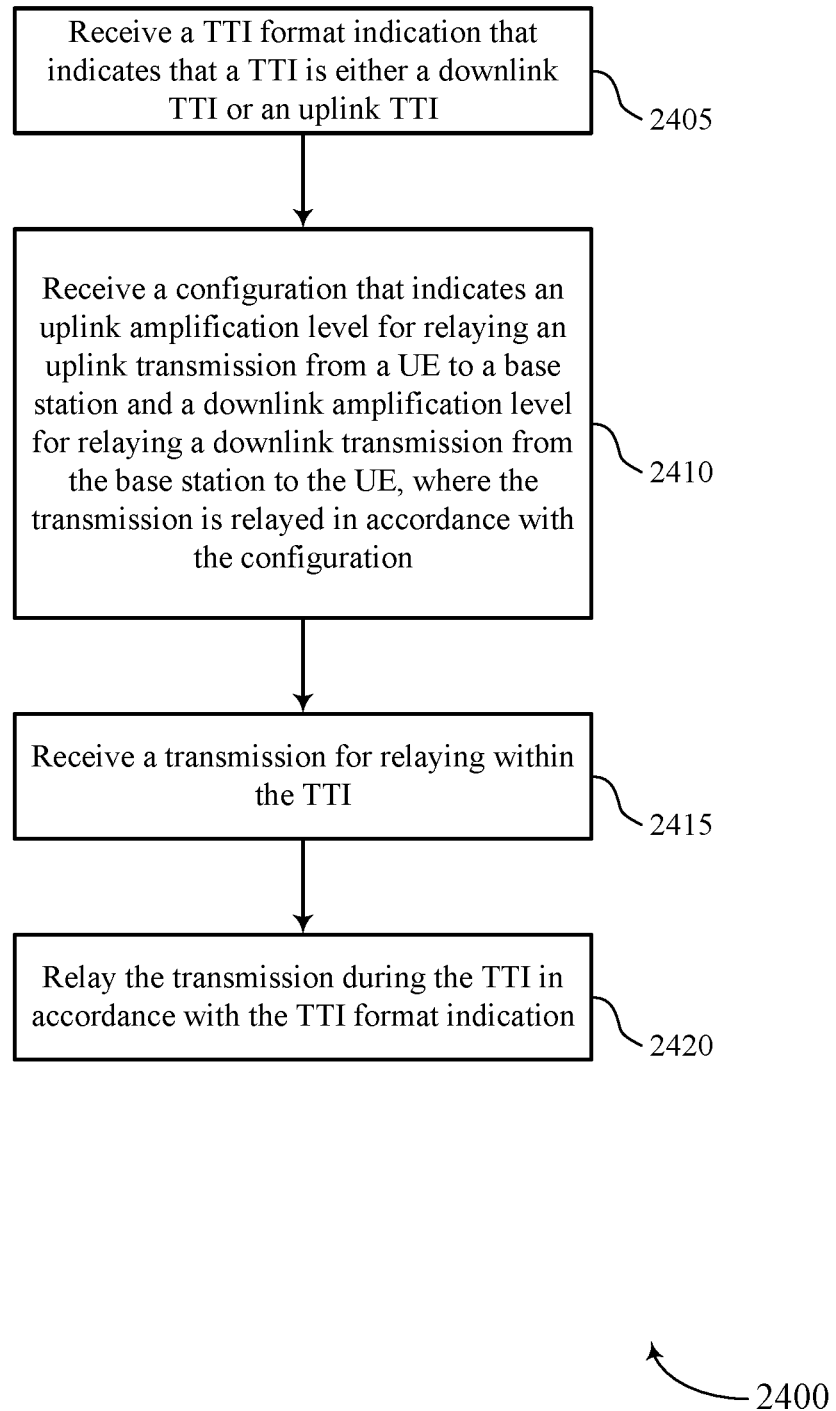

FIG. 24 shows a flowchart illustrating a method 2400 that supports positioning with relays in accordance with aspects of the present disclosure. The operations of method 2400 may be implemented by a relay node or its components as described herein. For example, the operations of method 2400 may be performed by a relay node communications manager as described with reference to FIGS. 16 through 19. In some examples, a relay node may execute a set of instructions to control the functional elements of the relay node to perform the functions described below. Additionally or alternatively, a relay node may perform aspects of the functions described below using special-purpose hardware.

At 2405, the relay node may receive a TTI format indication that indicates that a TTI is either a downlink TTI or an uplink TTI. The operations of 2405 may be performed according to the methods described herein. In some examples, aspects of the operations of 2405 may be performed by a TTI format component as described with reference to FIGS. 16 through 19.

At 2410, the relay node may receive a configuration that indicates an uplink amplification level for relaying an uplink transmission from a UE to a base station and a downlink amplification level for relaying a downlink transmission from the base station to the UE, where the transmission is relayed in accordance with the configuration. The operations of 2410 may be performed according to the methods described herein. In some examples, aspects of the operations of 2410 may be performed by an amplification configuration component as described with reference to FIGS. 16 through 19.

At 2415, the relay node may receive a transmission for relaying within the TTI. The operations of 2415 may be performed according to the methods described herein. In some examples, aspects of the operations of 2415 may be performed by a transmission relaying component as described with reference to FIGS. 16 through 19.

At 2420, the relay node may relay the transmission during the TTI in accordance with the TTI format indication. The operations of 2420 may be performed according to the methods described herein. In some examples, aspects of the operations of 2420 may be performed by a TTI format relaying component as described with reference to FIGS. 16 through 19.

Figure 25:
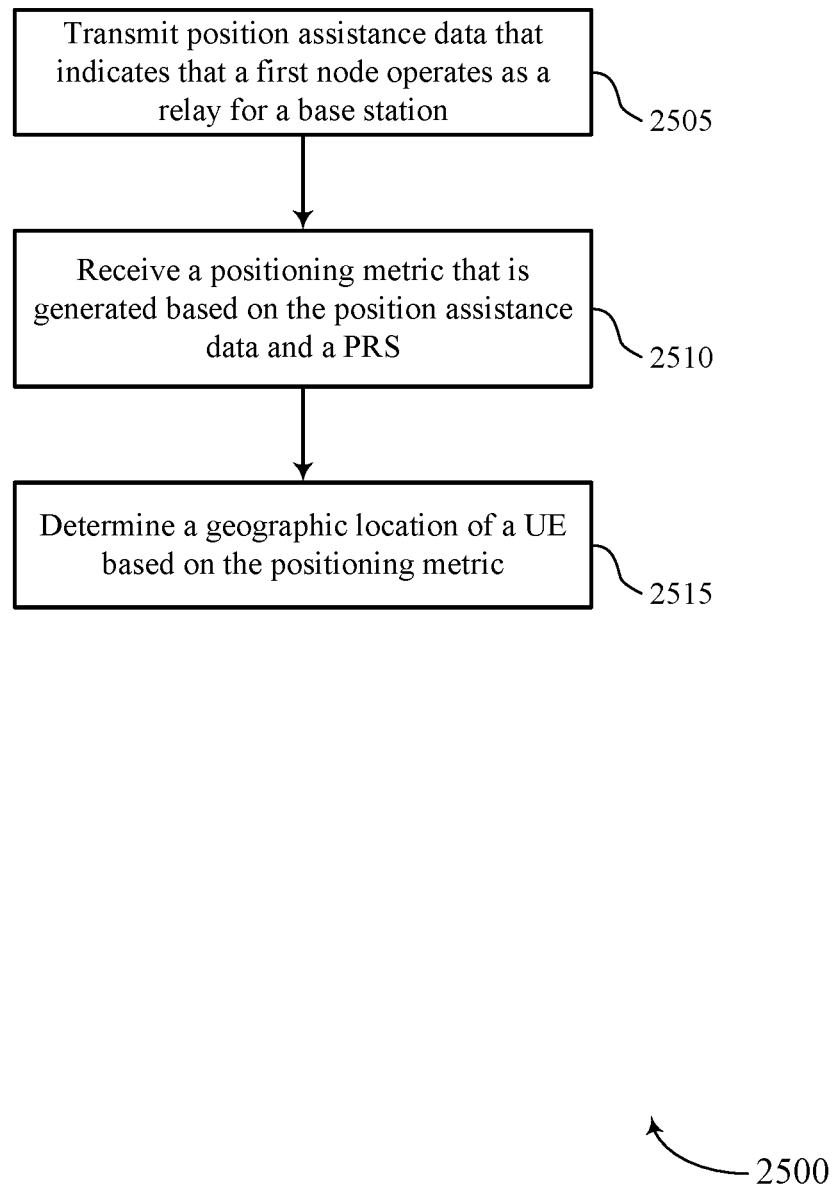

FIG. 25 shows a flowchart illustrating a method 2500 that supports positioning with relays in accordance with aspects of the present disclosure. The operations of method 2500 may be implemented by a location server or its components as described herein. For example, the operations of method 2500 may be performed by a location server communications manager as described with reference to FIGS. 8 through 11. In some examples, a location server may execute a set of instructions to control the functional elements of the location server to perform the functions described below. Additionally or alternatively, a location server may perform aspects of the functions described below using special-purpose hardware.

At 2505, the location server may transmit positioning assistance data that indicates that a first node operates as a relay (e.g., for a base station, a UE, etc.). The operations of 2505 may be performed according to the methods described herein. In some examples, aspects of the operations of 2505 may be performed by an positioning assistance data transmitter as described with reference to FIGS. 8 through 11.

At 2510, the location server may receive a positioning metric that is generated based on the positioning assistance data and a PRS. The operations of 2510 may be performed according to the methods described herein. In some examples, aspects of the operations of 2510 may be performed by a positioning metric component as described with reference to FIGS. 8 through 11.

At 2515, the location server may determine a geographic location of a UE based on the positioning metric. The operations of 2515 may be performed according to the methods described herein. In some examples, aspects of the operations of 2515 may be performed by a UE location determination component as described with reference to FIGS. 8 through 11.

Figure 26:
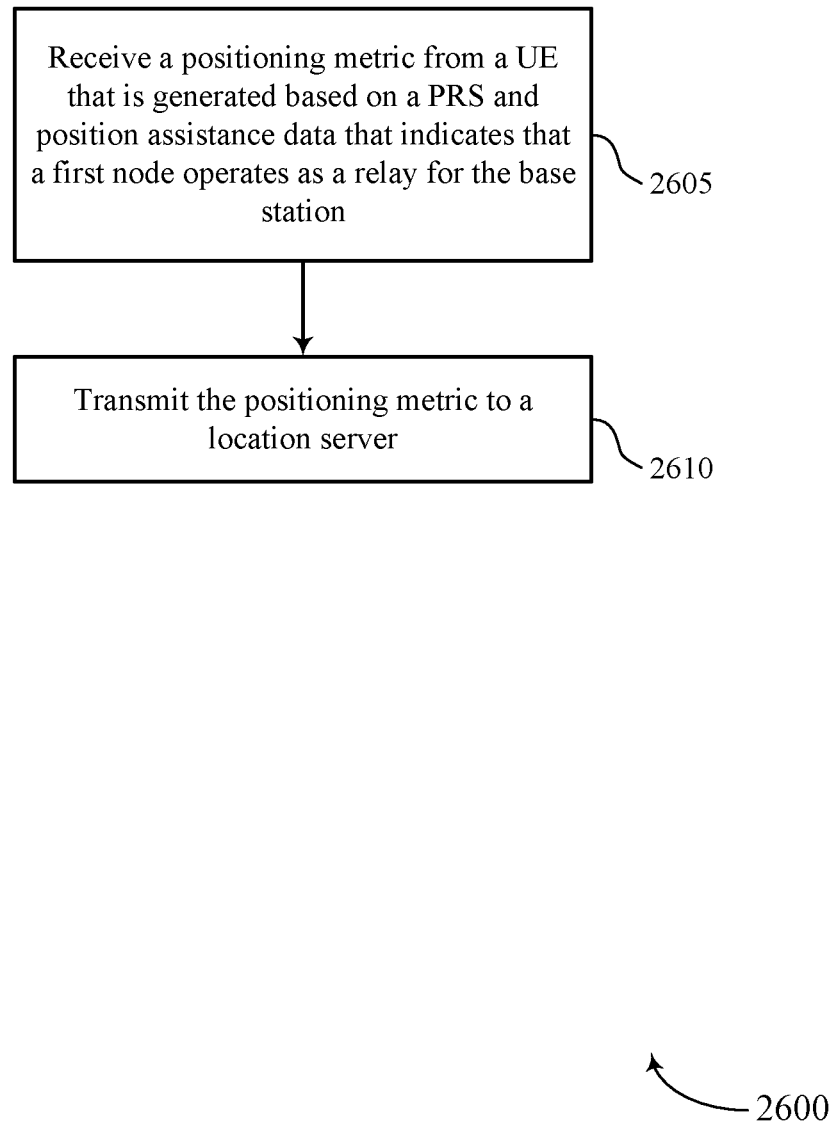

FIG. 26 shows a flowchart illustrating a method 2600 that supports positioning with relays in accordance with aspects of the present disclosure. The operations of method 2600 may be implemented by a base station 105 or its components as described herein. For example, the operations of method 2600 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2605, the base station may receive a positioning metric from a UE that is generated based on a PRS and positioning assistance data that indicates that a first node operates as a relay for the base station. The operations of 2605 may be performed according to the methods described herein. In some examples, aspects of the operations of 2605 may be performed by a positioning metric receiver as described with reference to FIGS. 12 through 15.

At 2610, the base station may transmit the positioning metric to a location server. The operations of 2610 may be performed according to the methods described herein. In some examples, aspects of the operations of 2610 may be performed by a positioning metric relay component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving positioning assistance data that indicates that a first node operates as a relay for a second node;
   receiving a positioning reference signal;
   determining whether the positioning reference signal is received from the first node operating as the relay for the second node or received from the second node, based at least in part on the positioning assistance data; and
   generating a positioning metric based at least in part on the positioning reference signal and the determination whether the positioning reference signal is received from the first node operating as the relay for the second node or received from the second node.

2. The method of claim 1, further comprising:
   generating the positioning metric based at least in part on determining that the positioning reference signal is received from the first node or the second node.

3. The method of claim 1, further comprising:
   selecting a third node to monitor that is not associated with a relay node based at least in part on the positioning assistance data;
   receiving a second positioning reference signal from the third node.

4. The method of claim 1, further comprising:
   processing the positioning assistance data to determine one or more of a cell identifier, a UE identifier, a geographic location, or a beam identifier, for the first node, the second node, or both.

5. The method of claim 1, further comprising:
   processing the positioning assistance data to determine one or more of an antenna array configuration, an antenna panel configuration, an orientation, a beam pattern, a backhaul beam, or an access beam, for the first node, the second node, or both.

6. The method of claim 1, further comprising:
   processing the positioning assistance data to determine a backhaul gain between the first and second nodes, an access gain between the first node and the UE, or both.

7. The method of claim 1, further comprising:
   processing the positioning assistance data to determine the first node is an active relay or a passive relay.

8. The method of claim 1, further comprising:
   processing the positioning assistance data to determine an orientation, attenuation, or both, for at least one angle of incidence for the first node.

9. The method of claim 1, further comprising:
   processing the positioning assistance data to determine delay introduced by the first node when relaying a transmission.

10. The method of claim 1, wherein the positioning metric comprises a detected time of arrival, an angle of arrival, or both.

11. The method of claim 1, further comprising:
    determining that the positioning reference signal is from one of the first node or the second based at least in part on a positioning reference signal identifier or a scrambling code associated with the positioning reference signal.

12. The method of claim 1, further comprising:
    determining the positioning metric based at least in part on one or more of a detected arrival time of the positioning reference signal, a propagation time, a relay delay, or any combination thereof.

13. The method of claim 1, further comprising:
    determining a first pair of candidate positioning metrics based at least in part on a first hypothesis that the positioning reference signal is received from the first node;
    determining a second pair of candidate positioning metrics based at least in part on a second hypothesis that the positioning reference signal is received from the second node; and
    selecting one of the first pair of candidate positioning metrics or the second pair of candidate positioning metrics as the positioning metric based at least in part on an outlier rejection scheme, wherein the positioning metric is a round trip time positioning metric.

14. The method of claim 1, further comprising:
    transmitting the positioning metric to the second node or a location server.

15. The method of claim 1, further comprising:
    determining a geographic location of the UE based at least in part on the positioning metric.

16. The method of claim 1, wherein the positioning metric is a differential measurement.

17. A method for wireless communications by a user equipment (UE), comprising:
    receiving positioning assistance data that indicates that a first node operates as a relay for a second node;
    receiving a positioning reference signal; and
    generating a positioning metric based at least in part on the positioning reference signal, wherein generating the positioning metric comprises:
    determining a first candidate positioning metric based at least in part on a first hypothesis that the positioning reference signal is received from the first node;
    determining a second candidate positioning metric based at least in part on a second hypothesis that the positioning reference signal is received from the second node; and
    selecting one of the first candidate positioning metric or the second candidate positioning metric as the positioning metric based at least in part on an outlier rejection scheme.

18. A method for wireless communications by a user equipment (UE), comprising:
    receiving positioning assistance data that indicates that a first node operates as a relay for a second node;
    receiving a positioning reference signal;
    generating a positioning metric based at least in part on the positioning reference signal, wherein the positioning metric is a differential measurement; and
    receiving an indication to avoid using the first and second nodes when generating the differential measurement, wherein the indication is a long term evolution positioning protocol (LPP) message, a radio resource control (RRC) message, a medium access control (MAC) control element (CE), or downlink control information.

19. A method for wireless communications by a user equipment (UE) comprising:
    receiving positioning assistance data that indicates that a first node operates as a relay for a second node;
    receiving a positioning reference signal;
    generating a positioning metric based at least in part on the positioning reference signal, wherein the positioning metric is a differential measurement; and
    determining to avoid using the first and second nodes when generating the differential measurement based at least in part on receiving side information indicating presence of a relay.

20. A method for wireless communications by a location server, comprising:
transmitting positioning assistance data that indicates that a first node operates as a relay for a second node;
receiving a positioning metric that is generated based at least in part on the positioning assistance data and a positioning reference signal that is transmitted by the first node operating as the relay for the second node or transmitted by the second node; and
determining a geographic location of a user equipment (UE) based at least in part on the positioning metric.

21. A method for wireless communications by a base station, comprising:
receiving a positioning metric from a user equipment (UE), wherein the positioning metric is generated based at least in part on a positioning reference signal and a determination whether the positioning reference signal is transmitted from the base station or transmitted from a first node that operates as a relay for the base station; and
transmitting the positioning metric to a location server.

22. The method of claim 21, further comprising:
transmitting an indication to avoid using a second positioning reference signal transmitted by the first node or the base station when generating the positioning metric that comprises a differential measurement, wherein the indication is a long term evolution positioning protocol (LPP) message, a radio resource control (RRC) message, a medium access control (MAC) control element (CE), or downlink control information.

23. The method of claim 21, wherein the base station is co-located with the location server.

24. The method of claim 21, further comprising:
transmitting the positioning reference signal.

25. An apparatus for wireless communications by a user equipment (UE), comprising:
a processor;
memory coupled with the processor; and
instructions stored in the memory and executable by the processor to cause the apparatus to:
receive positioning assistance data that indicates that a first node operates as a relay for a second node;
receive a positioning reference signal;
determine whether the positioning reference signal is received from the first node operating as the relay for the second node or received from the second node, based at least in part on the positioning assistance data; and
generate a positioning metric based at least in part on the positioning reference signal and the determination whether the positioning reference signal is received from the first node operating as the relay for the second node or received from the second node.

26. The apparatus of claim 25, wherein the instructions are further executable by the processor to cause the apparatus to:
generate the positioning metric based at least in part on determining that the positioning reference signal is received from the first node or the second node.

27. The apparatus of claim 25, wherein the instructions are further executable by the processor to cause the apparatus to:
determine that the positioning reference signal is from one of the first node or the second based at least in part on a positioning reference signal identifier or a scrambling code associated with the positioning reference signal.

28. An apparatus for wireless communications by a location server, comprising:
a processor;
memory coupled with the processor; and
instructions stored in the memory and executable by the processor to cause the apparatus to:
transmit positioning assistance data that indicates that a first node operates as a relay for a second node;
receive a positioning metric that is generated based at least in part on the positioning assistance data and a positioning reference signal that is transmitted by the first node operating as the relay for the second node or transmitted by the second node; and
determine a geographic location of a user equipment (UE) based at least in part on the positioning metric.

29. An apparatus for wireless communications by a base station, comprising:
a processor;
memory coupled with the processor; and
instructions stored in the memory and executable by the processor to cause the apparatus to:
receive a positioning metric from a user equipment (UE)), wherein the positioning metric is generated based at least in part on a positioning reference signal and a determination whether the positioning reference signal is transmitted from the base station or transmitted from a first node that operates as a relay for the base station; and
transmit the positioning metric to a location server.

30. An apparatus for wireless communications by a user equipment (UE), comprising:
means for receiving positioning assistance data that indicates that a first node operates as a relay for a second node;
means for receiving a positioning reference signal;
means for determining whether the positioning reference signal is received from the first node operating as the relay for the second node or received from the second node, based at least in part on the positioning assistance data; and
means for generating a positioning metric based at least in part on the positioning reference signal and the determination whether the positioning reference signal is received from the first node operating as the relay for the second node or received from the second node.

31. The apparatus of claim 30, further comprising:
means for generating the positioning metric based at least in part on determining that the positioning reference signal is received from the first node or the second node.

32. The apparatus of claim 30, further comprising:
means for determining that the positioning reference signal is from one of the first node or the second based at least in part on a positioning reference signal identifier or a scrambling code associated with the positioning reference signal.

33. An apparatus for wireless communications by a location server, comprising:
means for transmitting positioning assistance data that indicates that a first node operates as a relay for a second node;
means for receiving a positioning metric that is generated based at least in part on the positioning assistance data and a positioning reference signal that is transmitted by the first node operating as the relay for the second node or transmitted by the second node; and means for determining a geographic location of a user equipment (UE) based at least in part on the positioning metric.

34. An apparatus for wireless communications by a base station, comprising:
- means for receiving a positioning metric from a user equipment (UE), wherein the positioning metric is generated based at least in part on a positioning reference signal and a determination whether the positioning reference signal is transmitted from the base station or transmitted from a first node that operates as a relay for the base station; and
- means for transmitting the positioning metric to a location server.

35. An apparatus for wireless communications by a user equipment (UE), comprising:
- a processor;
- memory coupled with the processor; and
- instructions stored in the memory and executable by the processor to cause the apparatus to:
  - receive positioning assistance data that indicates that a first node operates as a relay for a second node;
  - receive a positioning reference signal; and
  - generate a positioning metric based at least in part on the positioning assistance data and the positioning reference signal, wherein the instructions to generate the positioning metric are further executable by the processor to cause the apparatus to:
    - determine a first candidate positioning metric based at least in part on a first hypothesis that the positioning reference signal is received from the first node;
    - determine a second candidate positioning metric based at least in part on a second hypothesis that the positioning reference signal is received from the second node; and
    - select one of the first candidate positioning metric or the second candidate positioning metric as the positioning metric based at least in part on an outlier rejection scheme.

36. An apparatus for wireless communications by a user equipment (UE), comprising:
- a processor;
- memory coupled with the processor; and
- instructions stored in the memory and executable by the processor to cause the apparatus to:
  - receive positioning assistance data that indicates that a first node operates as a relay for a second node;
  - receive a positioning reference signal;
  - generate a positioning metric based at least in part on the positioning assistance data and the positioning reference signal, wherein the positioning metric is a differential measurement; and
  - receive an indication to avoid using the first and second nodes when generating the differential measurement, wherein the indication is a long term evolution positioning protocol (LPP) message, a radio resource control (RRC) message, a medium access control (MAC) control element (CE), or downlink control information.

37. An apparatus for wireless communications by a user equipment (UE), comprising:
- a processor;
- memory coupled with the processor; and
- instructions stored in the memory and executable by the processor to cause the apparatus to:
  - receive positioning assistance data that indicates that a first node operates as a relay for a second node;
  - receive a positioning reference signal;
  - generate a positioning metric based at least in part on the positioning assistance data and the positioning reference signal, wherein the positioning metric is a differential measurement; and
  - determine to avoid using the first and second nodes when generating the differential measurement based at least in part on receiving side information indicating presence of a relay.

* * * * *